(12) United States Patent
Coile et al.

(10) Patent No.: US 7,730,190 B2
(45) Date of Patent: Jun. 1, 2010

(54) SYSTEM FOR DISTRIBUTING LOAD OVER MULTIPLE SERVERS AT AN INTERNET SITE

(75) Inventors: Brantley W. Coile, Athens, GA (US);
Richard A. Howes, Roswell, GA (US);
Edward C. Kersey, Athens, GA (US);
Peter A. Tenereillo, Vista, CA (US)

(73) Assignee: Cisco Technology, Inc., San Jose, CA (US)

( * ) Notice: Subject to any disclaimer, the term of this patent is extended or adjusted under 35 U.S.C. 154(b) by 340 days.

(21) Appl. No.: 11/566,559

(22) Filed: Dec. 4, 2006

(65) Prior Publication Data

US 2007/0088822 A1    Apr. 19, 2007

Related U.S. Application Data

(63) Continuation of application No. 09/954,523, filed on Sep. 12, 2001, now Pat. No. 7,146,417, which is a continuation of application No. 08/850,248, filed on May 2, 1997, now Pat. No. 6,317,775, which is a continuation-in-part of application No. 08/552,807, filed on Nov. 3, 1995, now Pat. No. 5,793,763.

(51) Int. Cl.
*G06F 15/16* (2006.01)

(52) U.S. Cl. .................................... 709/227

(58) Field of Classification Search ................ 709/217, 709/218, 219, 223, 224, 227
See application file for complete search history.

(56) References Cited

U.S. PATENT DOCUMENTS

| | | | | |
|---|---|---|---|---|
| 5,371,852 A | 12/1994 | Attanasio et al. | ............ | 395/200 |
| 5,444,848 A * | 8/1995 | Johnson et al. | ............. | 709/241 |
| 5,459,837 A | 10/1995 | Caccavale | .................... | 709/226 |
| 5,471,617 A | 11/1995 | Farrand et al. | .............. | 718/100 |
| 5,504,894 A | 4/1996 | Ferguson et al. | ............ | 395/650 |
| 5,617,417 A | 4/1997 | Sathe et al. | ................. | 370/394 |
| 5,675,741 A | 10/1997 | Aggarwal et al. | ........... | 709/242 |
| 5,694,543 A | 12/1997 | Inoue | ............................ | 714/4 |
| 5,696,701 A | 12/1997 | Burgess et al. | ................ | 714/25 |
| 5,774,660 A | 6/1998 | Brendel et al. | .............. | 709/201 |

(Continued)

FOREIGN PATENT DOCUMENTS

WO    PCT/FR96/01179    2/1997

OTHER PUBLICATIONS

Web Page for Coyote Point Systems, 1997, http://www.coyotepoint.com.

*Primary Examiner*—Douglas B Blair
(74) *Attorney, Agent, or Firm*—Baker Botts L.L.P.

(57) ABSTRACT

Disclosed is a system and method for distributing connections among a plurality of servers at an Internet site. All connections are made to a single IP address and a local director selects the server from among the plurality of servers which is to receive the connection. Thus, the DNS server is not relied upon to distribute connections, and the connection distribution scheme is not avoided when DNS is bypassed. In one embodiment, a session distribution scheme is implemented such that connections are distributed to the server in the group of servers which has the fewest connections of the group. In other embodiments, other session distribution schemes which route connections based on the predicted response times of the servers or according to a round robin scheme are used.

30 Claims, 17 Drawing Sheets

U.S. PATENT DOCUMENTS

| | | | |
|---|---|---|---|
| 5,774,668 A | 6/1998 | Choquier et al. | 395/650 |
| 5,793,763 A * | 8/1998 | Mayes et al. | 370/389 |
| 5,796,633 A | 8/1998 | Burgess et al. | 702/187 |
| 5,894,554 A | 4/1999 | Lowery et al. | 395/200.33 |
| 6,003,030 A | 12/1999 | Kenner et al. | 707/10 |
| 6,038,664 A * | 3/2000 | Schumacher et al. | 713/2 |
| 6,047,323 A * | 4/2000 | Krause | 709/227 |
| 6,067,580 A | 5/2000 | Aman et al. | 709/330 |
| 6,097,882 A * | 8/2000 | Mogul | 709/201 |
| 6,144,961 A | 11/2000 | de la Salle | 707/10 |
| 6,185,619 B1 | 2/2001 | Joffe et al. | 709/229 |
| 6,317,775 B1 * | 11/2001 | Coile et al. | 709/201 |
| 6,714,975 B1 | 3/2004 | Aggarwal et al. | 709/224 |
| 6,745,224 B1 | 6/2004 | D'Souza et al. | 709/202 |
| 6,810,411 B1 * | 10/2004 | Coughlin et al. | 709/203 |
| 6,832,256 B1 | 12/2004 | Toga | 709/229 |
| 6,859,828 B1 | 2/2005 | Morgan et al. | 709/224 |
| 6,889,263 B2 | 5/2005 | Motoyama | 710/15 |
| 6,970,952 B2 | 11/2005 | Motoyama | 710/15 |
| 6,978,263 B2 | 12/2005 | Soulanille | 707/3 |
| 7,020,700 B1 | 3/2006 | Bennett et al. | 709/224 |
| 7,146,417 B1 * | 12/2006 | Coile et al. | 709/224 |
| 7,593,987 B2 * | 9/2009 | Salesky et al. | 709/204 |
| 7,627,663 B2 * | 12/2009 | Salesky et al. | 709/223 |

* cited by examiner

PHYSICAL MACHINE OBJECT — 350

- 350 — POINTER TO NEXT PHYSICAL MACHINE OBJECT
- 352 — REAL IP ADDRESS OF THE PHYSICAL MACHINE
- 354 — LAST RESPONSE TIME OF THE PHYSICAL
- 356 — THE NUMBER OF VIRTUAL MACHINES LINKED TO THE PHYSICAL MACHINE
- 358 — RESPONSE TIME BIASED BY AGE (PREDICTED RESPONSE TIME)
- 360 — AGE STAMP
- 362 — MAC ADDRESS OF THE PHYSICAL MACHINE
- 364 — NUMBER OF UNANSWERED SYN CONNECTIONS
- 366 — STATE OF THE PHYSICAL MACHINE (IN SERVICE, OUT OF SERVICE, OR FAIL)
- 368 — NUMBER OF DITCHED CONNECTIONS
- 370 — CONNECTION FAILURE THRESHOLD
- 371 — NUMBER OF CONNECTIONS TO PHYSICAL MACHINE
- 372 — LOCAL PORT NUMBER
- 373 — MAXIMUM NUMBER OF ALLOWED CONNECTIONS
- 374 — CONNECTION TIMEOUT
- 375 — POINTER TO BACKUP MACHINE
- 376 — WEIGHT
- 377 — PORT VARIABLE

FIG. 3B

FPA OBJECT — 372

- 386 — POINTER TO A PHYSICAL MACHINE OBJECT
- 387 — FOREIGN IP ADDRESS
- 388 — TIME OF LAST CONNECTION
- 389 — POINTERS TO OTHER FPA OBJECTS

FIG. 3D

LINK OBJECT — 373

- 391 — POINTER TO NEXT LINK OBJECT
- 392 — POINTER TO A PHYSICAL MACHINE OBJECT
- 393 — POINTER TO A PORT OBJECT

FIG. 3E

PORT OBJECT — 374

- 395 — POINTER TO NEXT PORT OBJECT
- 396 — PORT NUMBER AS VIEWED BY THE CLIENT
- 397 — PORT NUMBER AS MAPPED TO A PHYSICAL MACHINE PORT

FIG. 3F $$470 \sim R = \frac{I}{NC}$$

$$472 \sim PR = NC \cdot R - f(t)$$

$$474 \sim f(t) = \frac{t_{CURRENT} - t_{AGE\ STAMP}}{4}$$

SYSTEM FOR DISTRIBUTING LOAD OVER MULTIPLE SERVERS AT AN INTERNET SITE

CROSS REFERENCE TO RELATED APPLICATIONS

This application is a continuation of U.S. application Ser. No. 09/954,523, filed Sep. 12, 2001 and now U.S. Pat. No. 7,146,417, which is a continuation of U.S. application Ser. No. 08/850,248 filed May 2, 1997 and now U.S. Pat. No. 6,317,775, which is a continuation-in-part of U.S. application Ser. No. 08/552,807 filed Nov. 3, 1995 and now U.S. Pat. No. 5,793,763, which are incorporated herein by reference for all purposes.

This application is related to application Ser. Nos. 08/850,730 and 08/850,836, filed concurrently herewith and now U.S. Pat. Nos. 6,061,349 and 6,104,717 respectively, which are incorporated herein by reference for all purposes.

BACKGROUND OF THE INVENTION

The present invention relates to methods and apparatus for simulating a virtual server by distributing connection requests over multiple servers at an Internet site. More specifically, the invention relates to methods and apparatus for monitoring the availability of servers at an Internet site which simulate a virtual server and preferentially sending new connection requests to servers which are available for connections and which are likely to have faster response times.

With the recent explosive growth of the Internet, some Internet sites have experienced a very high demand for their services. Many busy sites require multiple servers to adequately service their demands. It is not uncommon for 20 or 30 servers to be dedicated to a given site. The environment of an exemplary multiple server site is shown in FIG. 1A, where a group of servers 112 work together to service requests made to their site. Such servers might be World Wide Web servers, for example.

Normally, a human user of the Internet addresses his or her message to a particular internet site by specifying a particular domain name (for example, www.NameX.com). The servers at that site are all associated with the same domain name. When a connection request is received from a user, one of the servers at the internet site must be selected to receive the packet from the user containing the connection request. The packet is then directed to that physical machine. Currently, selection of a server is accomplished by the Domain Name Service (DNS) server which returns an IP address for the domain name.

For convenience, Internet users typically address messages to a domain name rather than to an IP address. This makes it necessary to convert the domain name to an IP address before the message can be routed to a server. To simplify the procedure for accomplishing this, the Internet protocol known as DNS was developed in 1983 by a group of Internet administrators. Typically, a domain name server is provided at the front end of an Internet site. DNS is implemented so that incoming messages addressed to the site can be converted to the proper IP addresses. DNS simply maps domain names provided by a user attempting to access an internet site to one of the IP address which corresponds to a server that serves the site corresponding to the domain name.

While a multiple server site typically has a single domain name which applies to the entire site and therefore to all of the servers at the site, each separate server has its own globally unique IP address so that the server may be individually accessed. For a given server to receive a message, that message must be directed to the server's IP address.

The DNS server determines which physical machine will service a particular request by the IP address given in response to DNS requests. The user therefore selects the domain name and a particular server IP address is assigned for a server that services that domain. This approach works since the user does not typically care which of the machines at a multiple server site services his or her connection request. It is, however, desirable that each connection request be responded to as quickly as possible.

In sites having multiple servers, more than one server is associated with a given domain name and so there must be some mechanism for distributing incoming messages for the same domain name among individual servers with different IP addresses. For this mechanism, most enterprises with multiple servers for a given site now employ a technique known as "round robin DNS." Round robin DNS simply cycles the IP addresses of the individual server machines in response to successive requests to access the site by name so that the servers take turns handling connection requests.

For example, in a group of servers 112 shown in FIG. 1A, an initial request to access the site might be directed to a server 112A. The second request would then be directed to a server 112B; the third request would be directed to a server 112C; and so on, until all of the servers in group of servers 112 have received a single request for access. Then, the next successive request for access is directed back to server 112A. The next request thereafter is directed to server 112B, and so on in a round robin manner.

While this technique does help distribute a site's traffic load over a plurality of servers, it certainly does not guarantee that incoming requests will be routed to the servers best able to handle such requests. The round robin distribution scheme is arbitrary and therefore does not necessarily direct incoming requests to the least loaded server. Round robin DNS, in fact, will often send an incoming request to an already heavily loaded server. That request will therefore not be acted upon as promptly as it might have been had it been routed to a different server that was less heavily loaded.

One reason that round robin DNS routes some incoming connection requests to slower servers is that it does not take into account the varying load capacities of the machines and the varying demands on the resources of the machines by different connection requests. Therefore, a given machine in the round robin rotation may become excessively loaded with connections due to its own lack of capacity or the greater requirements of certain of its connections compared to connections made to other machines in the round robin rotation. The excess loading on an individual machine may negatively effect responsiveness of the machine. In such a case, this will result in excessive time delays by this machine whenever data is requested from it. It would be desirable if machines with slower response times or greater connection loads could be identified and if machines with much faster response times or lesser connection loads could be identified, so that connections could be selectively routed to the more responsive machines and the connection loads could be decreased on more loaded and therefore less responsive machines.

A technique known as "DNS caching" creates another problem for round robin DNS. DNS caching is a procedure which is implemented by certain Internet service providers or other clients who often send requests to a given domain name. By noting the source IP address in the packet headers of the packets which are sent from the servers, a client may learn the IP addresses of the servers associated with that domain name. The client may then cache the IP address so that future connection requests addressed to that domain name can be directed to the specific IP address at the service site. Thus, the client bypasses the DNS and chooses the IP address of the physical machine which will service its connection request directly. While this saves the computational time normally required to look up IP addresses on the Internet, it effectively circumvents the round robin DNS connection allocation system (or any other DNS allocation system) and therefore prevents the load on a set of servers from being distributed according to a planned scheme. Clients learn the IP addresses for individual servers and access them at will.

Thus, what is needed is an improved system and method for distributing the load among a plurality of servers at an Internet site. Additionally, it would be desirable if a system and method were developed for preventing clients from accessing a server directly and bypassing the distribution scheme which is implemented.

SUMMARY OF THE INVENTION

The present invention provides a system and method for distributing connections among a plurality of servers at an Internet site. All connections are made to a single IP address and a local director selects the server from among the plurality of servers which is to receive the connection. Thus, the DNS server is not relied upon to distribute connections, and the connection distribution scheme is not avoided when DNS is bypassed. In one embodiment, a session distribution scheme is implemented such that connections are distributed to the server in the group of servers which has the fewest connections of the group. In other embodiments, other session distribution schemes which route connections based on the predicted response times of the servers or according to a round robin scheme are used.

BRIEF DESCRIPTION OF THE DRAWINGS

FIG. 3B illustrates the data structure of a physical machine object.

FIG. 3D illustrates a Foreign Physical Allocation (FPA) object data structure.

FIG. 3E illustrates a link object data structure.

FIG. 3F illustrates a Port object data structure.

DESCRIPTION OF THE PREFERRED EMBODIMENTS

Figure 1A:
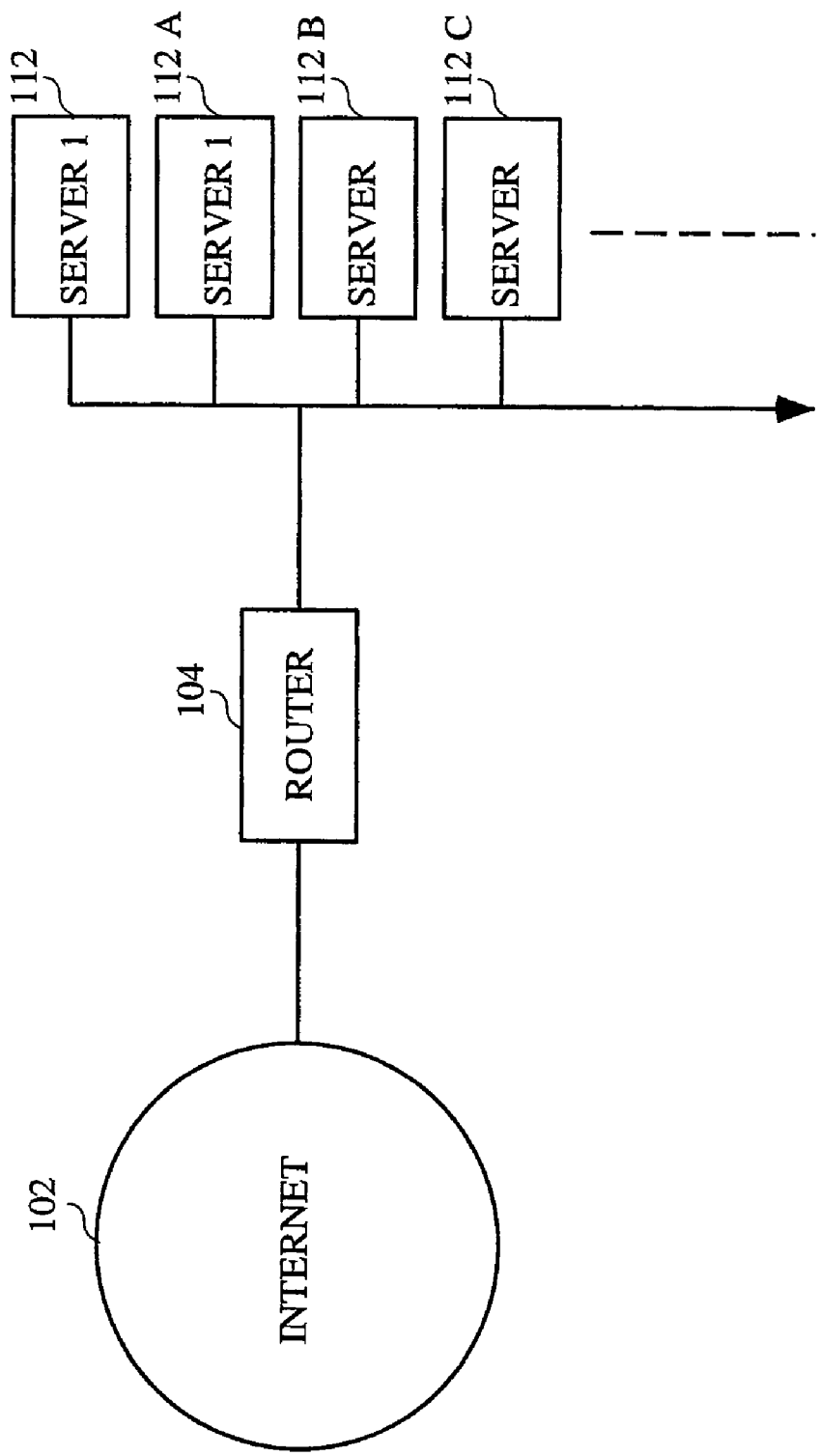
FIG. 1A is a block diagram of a network segment including an Internet site having a plurality of servers.

The basic problem of networking a set of devices has been divided into layers. The bottom layer is a physical layer. It handles the actual physical connections between devices. The second layer is the data link layer. It describes how the data is formatted which is on the physical medium which connects the devices. The third layer is the network layer. It handles cases where there is greater than one connection per machine. The fourth layer is the transport layer. This determines that all of the messages from a source reach the destination reliably and in an unduplicated fashion. The second layer is subdivided into a Logical Link Control ("LLC") layer and a Media Access Control ("MAC") layer. A MAC address is required in this layer. In the TCP/IP suite of protocols employed on the Internet, the third layer or network layer is the IP layer. This layer requires a globally unique IP address in order to route packets to the right physical machine. The IP address is issued by a central authority known as the Internet Assigned Number Authority ("IANA"). Also, in TCP/IP, the fourth layer or transport layer is the TCP layer. The TCP layer additionally requires a machine port number so that the packet is sent to the correct port of a specific machine. The present invention is implemented in one embodiment by redefining source or destination IP addresses in packet headers so that inbound packets are routed by an internet site to specific physical machines and outbound packets are made to appear to have been sent from a virtual machine.

The present invention employs various process steps involving data manipulation. These steps require physical manipulation of physical quantities. Typically, these quantities take the form of electrical or magnetic signals capable of being stored, transferred, combined, compared, and otherwise manipulated. It is sometimes convenient, principally for reasons of common usage, to refer to these signals as bits, values, variables, characters, data packets, or the like. It should be remembered, however, that all of these and similar terms are to be associated with the appropriate physical quantities and are merely convenient labels applied to these quantities.

Further, the manipulations performed are often referred to in terms, such as translating, running, selecting, specifying, determining, or comparing. In any of the operations described herein that form part of the present invention, these operations are machine operations. Useful machines for performing the operations of the present invention include general purpose and specially designed computers or other similar devices. In all cases, there should be borne in mind the distinction between the method of operations in operating a computer or other processing device and the method of computation itself. The present invention relates to method steps for operating a Local Director system in processing electrical or other physical signals to generate other desired physical signals.

The present invention also relates to an apparatus for performing these operations. This apparatus may be specially constructed for the required purposes, or it may be a general purpose programmable machine selectively activated or reconfigured by a computer program stored in memory. The processes presented herein are not inherently related to any particular computer or other apparatus. In particular, various general purpose machines may be used with programs written in accordance with the teachings herein, or it may be more convenient to construct a more specialized apparatus to perform the required method steps. The general structure for a variety of these machines will appear from the description given below.

Still further, the present invention relates to machine readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Figure 1B:
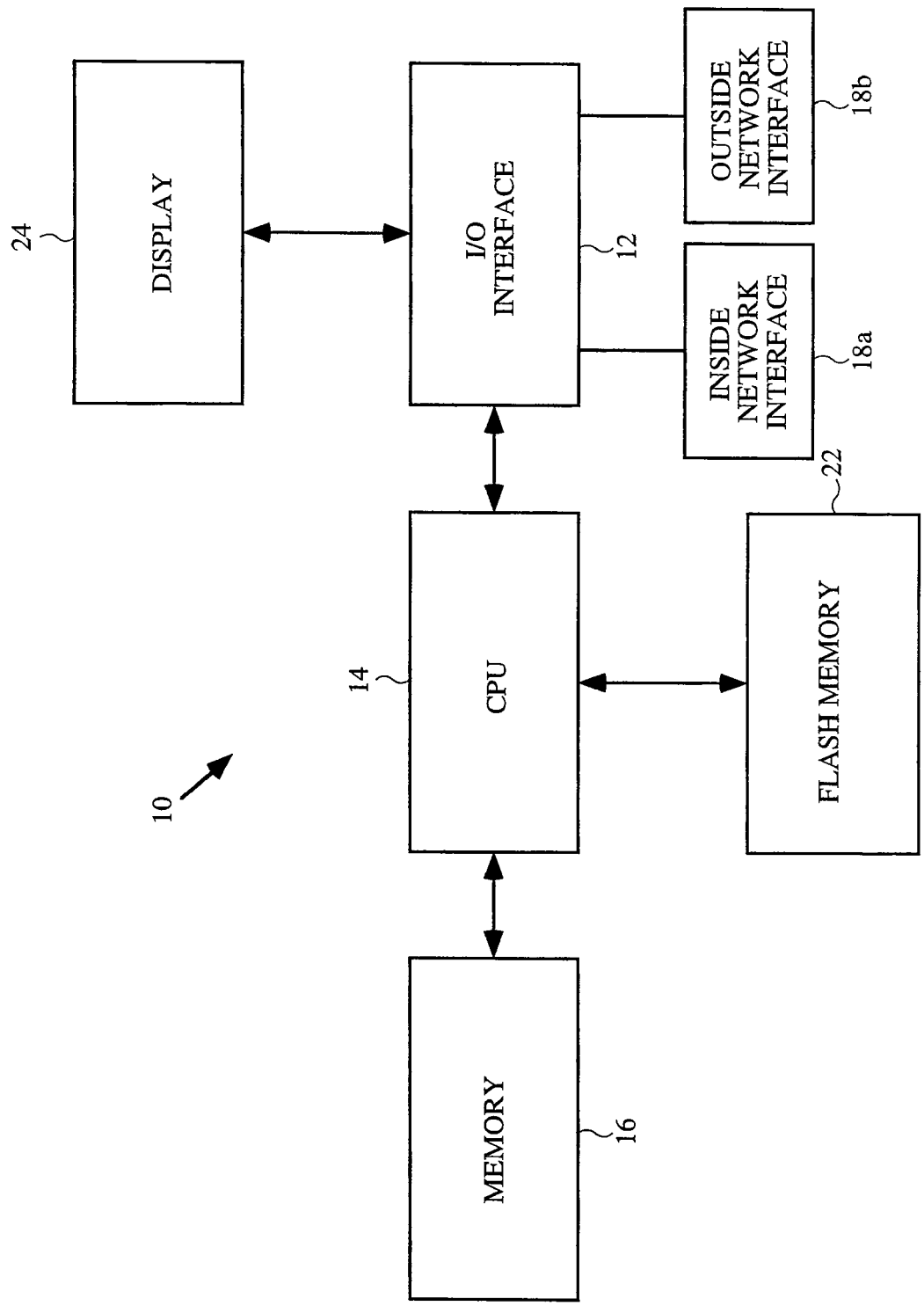
FIG. 1B shows a typical computer-based system which may be used as a Local Director of the present invention.

FIG. 1B shows a typical computer-based system which may be used as a Local Director of the present invention. Shown is a computer 10 which comprises an input/output circuit 12 used to communicate information in appropriately structured form to and from the parts of computer 10 and associated equipment, a central processing unit 14, and a memory 16. These components are those typically found in most general and special purpose computers 10 and are intended to be representative of this broad category of data processors.

Connected to the input/output circuit 12 are inside and outside high speed Local Area Network interfaces 18a and 18b. The inside interface 18a will be connected to a private network, while the outside interface 18b will be connected to an external network such as the Internet. Preferably, each of these interfaces includes (1) a plurality of ports appropriate for communication with the appropriate media, and (2) associated logic, and in some instances (3) memory. The associated logic may control such communications intensive tasks as packet integrity checking and media control and management. The high speed interfaces 18a and 18b are preferably multiport Ethernet interfaces, but may be other appropriate interfaces such as FDDI interfaces, etc.

The computer system may also include an input device (not shown) such as a keyboard. A flash memory device 22 is coupled to the input/output circuit 12 and provides additional storage capability for the computer 10. The flash memory device 22 may be used to store programs, data and the like and may be replaced with a magnetic storage medium or some other well known device. It will be appreciated that the information retained within the flash memory device 22, may, in appropriate cases, be incorporated in standard fashion into computer 10 as part of the memory 16.

In addition, a display monitor 24 is illustrated which is used to display the images being generated by the present invention. Such a display monitor 24 may take the form of any of several well-known varieties of cathode ray tube displays and flat panel displays or some other type of display.

Although the system shown in FIG. 1B is a preferred computer system of the present invention, the displayed computer architecture is by no means the only architecture on which the present invention can be implemented. For example, other types of interfaces and media could also be used with the computer.

Figure 1C:
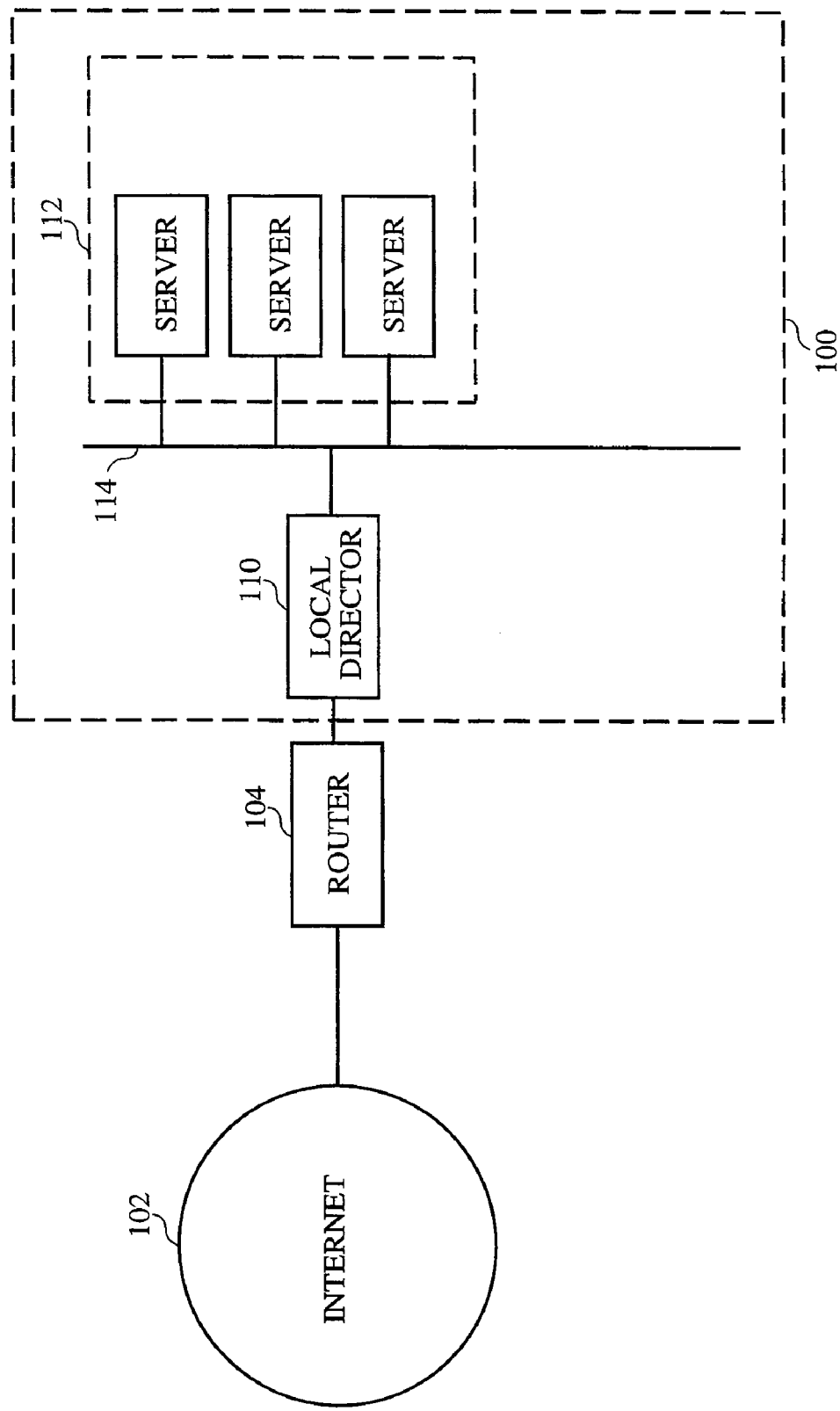
FIG. 1C is a block diagram of a network segment including a Local Director used with an Internet site having a plurality of servers in accordance with one embodiment of the present invention.

FIG. 1C is a block diagram of a network segment which utilizes one embodiment of the present invention and is arranged as follows. An Internet site 100 is connected to the whole of the Internet 102 through a router 104. Specifically, router 104 typically provides a connection to an Internet service provider. A Local Director 110 is directly connected to router 102 and serves as a front end to a group of TCP based servers 112. The group of TCP based servers 112 (including server 112A, server 112B, and server 112C in the example shown in FIG. 1B) may include a large number of servers and may generally provide any kind of TCP service.

For example, the group of TCP based servers 112 may be World Wide Web servers, FTP servers, mail servers, news servers, database servers, Telnet servers, etc., or the group of TCP based servers may each perform a combination of those tasks. Servers 112A, 112B, and 112C as well as other servers and devices are connected to one another through a network cable 114.

Requests to internet site 100 from external sites on Internet 102 are routed through Local Director 110. Local Director 110 determines which server of group of TCP based servers 4 should receive the request. Briefly, it does this as follows. A virtual IP address is defined for internet site 100. This virtual IP address is the IP address which the outside world, including the rest of the Internet 102, uses to access internet site 100. To an outside client, it appears that a single virtual machine having a single virtual IP address services internet site 100. The individual identities and IP addresses of the individual servers within the group of TCP based servers 112 are not evident to the user. In certain embodiments, group of TCP based servers 4 may implement more than one virtual server as described in U.S. patent application Attorney Docket No. CISCP007 filed concurrently herewith, which is incorporated herein by reference. In such embodiments, a plurality of virtual machines are implemented on different port numbers of a set of real or physical machines. In accordance with the present invention, each virtual machine may allocate connections to a plurality of physical machines.

It should be recognized that in the above paragraph and throughout this specification, the user who is accessing internet site 100 via Local Director 110 is referred to as the "client," and the group of machines associated with Local Director 110 are referred to as "servers." It should, however, be recognized that in certain applications, the group of machines associated with Local Director 110 would actually be considered the client and the device on the other site of Local Director 110 would be considered the server. Such applications also fall within the scope of the present invention. It should also be recognized that, although the embodiment described establishes connections to the Internet using TCP/IP, the present invention may also be used in conjunction with other protocols to connect to a LAN or WAN.

The group of TCP based servers 112 are referred to as either real or physical machines because they actually exist, as opposed to a virtual machine. The Local Director 110 effectively simulates communication inbound to one or more virtual machines having virtual IP addresses using the set of physical machines provided in the group of TCP based servers 112 by intercepting inbound packets sent to a virtual machine and replacing the virtual IP address with a physical machine IP address. Similarly, the Local Director 110 effectively simulates communication outbound from one or more virtual machines by intercepting outbound packets from the physical machines and replacing the physical machine IP addresses with virtual machine IP addresses.

When router 104 receives a request to access internet site 100 by a domain name (e.g., www.NameX.com), that domain name is mapped to the IP address of internet site 100. This is done by a DNS server. The DNS server does not provide a real IP address of a real machine, but instead provides a virtual IP address of a virtual machine which is implemented on Local Director 110. Local Director 110 then receives all packets sent to the virtual IP address and redirects them to a selected individual server form among the group of TCP based servers 112. Local Director 110 accomplishes this by changing the destination IP address in each packet from the virtual IP address which corresponds to the virtual machine implemented by group of TCP based servers 112 associated with Local Director 110, to a real IP address which corresponds to a single physical machine, i. e. the IP address corresponding to the individual server which is selected to handle the packet.

Local Director 110 thus operates to distribute packets among group of TCP based servers 112 by intercepting each packet sent to a virtual machine at internet site 100 and changing the destination IP address in the packet from a virtual IP address which corresponds to all of internet site 100 to a real IP address which corresponds to a single physical machine located at internet site 100. In certain embodiments, Local Director 110 includes more than one virtual machine IP address and therefore routes connections for more than one virtual machine to a set of physical machines through the physical machine's ports. Additionally, in such embodiments, it is also possible that each physical machine is mapped to more than one virtual machine. Such a system is described in detail in co-pending application Ser. No. 08/850,730, filed concurrently herewith, and previously incorporated by reference.

In accordance with the TCP protocol, when a new connection request that is intended for the domain name corresponding to internet site 100 is generated by a client, a SYN packet is sent with a destination IP address which corresponds to the virtual IP address for internet site 100. Local Director 110 intercepts the packet and determines that the destination IP address corresponds to a virtual IP address of a virtual machine which is implemented by Local Director 110. Local Director 110 then attempts to route the packet to the physical machine which is selected according to a session distribution scheme, i.e. the physical machine which is expected to respond most quickly to the request with data. This is accomplished by changing the destination IP address of the packet from the virtual IP address to the real IP address of the physical machine with the best predicted response time.

By adopting a single virtual IP address for the entire server group of TCP based servers 112, the problems of round robin DNS and DNS caching are avoided. Specifically, any connection made to the virtual IP address of a virtual machine is perceived by the connecting entity as a connection to the virtual machine and not as a connection to the physical machine to which the connection is physically made. The connecting entity never discovers the real IP address of the real machine handling the connection since, for outgoing packets, the real machine source IP address is replaced with the virtual machine IP address by the Local Director. Therefore a connecting entity which caches IP addresses using DNS caching caches the virtual machine IP address and will not address connection requests exclusively to any one server from group of TCP based servers 4 to the exclusion of the other servers in group of TCP based servers 4.

As shown above, each of the physical machines which function as a server in the group of TCP based servers 112 shares a common virtual IP address for connection with the Internet 102. Each physical machine also still has an individual real IP address which allows packets to be routed to individual physical machines within the local network of internet site 100. Local Director 110 translates the virtual IP address of incoming messages to the proper local server IP address using a network address translation protocol. One such network address translation scheme which is used in certain embodiments of the present invention is described in K. Egevang and P. Francis, "The IP Network Address Translator (NAT)," RFC 1631, Cray Communications, NTT, May 1994 which is incorporated herein by reference for all purposes. In addition, U.S. patent application Ser. No. 08/552,807 describes a secure system for implementing a network address translation scheme. That patent application is incorporated herein by reference for all purposes.

Local Director 110 attempts to route each packet to a physical machine which is chosen according to a session distribution scheme. Local Director 110 uses the session distribution scheme to elect a server to receive the next incoming connection. In certain embodiments, a number of session distribution schemes or combinations of session distribution schemes may be selected for each virtual machine which is implemented.

One preferred session distribution scheme is implemented by keeping track of the number of connections on each available physical machine and routing new connections to the physical machine which currently has the least number of connections. This scheme tends to balance the load across the available physical machines and also to select the machine with the fastest response time for the next connection because the fastest machine tends to be the first machine to finish with connections. The fastest machine is therefore constantly jumping ahead of the slower machines by finishing connections first. When the fastest machine jumps ahead and has the least number of connections, it is allocated more connections.

In another embodiment, a session distribution scheme is implemented in which the fastest machine is determined by measuring the time delay interval between the time when a data packet which is a read request from a client is received and the time when the server responds with a first packet containing data. By monitoring each connection made to a server in this manner, Local Director 110 maintains a list of response times—one for each machine. These response times are aged periodically and updated whenever a new connection is made to a server. Based upon the list of response times, Local Director 110 allocates connections to individual servers within the group of TCP based servers 112.

For example, if server 112B is found to be very fast, server 112A to be slower, and server 112C to be very slow, Local Director 110 will route connections to server 112B exclusively until that server's response time slows, or the response time of server 112A or 112C improves sufficiently as a result of aging. As described above, depending on the session distribution scheme which is used, the speed of each server is estimated either by the number of connections to the machine (i.e. faster machines have fewer connections) or by directly measuring response times. If directly measured response times are used, occasionally, Local Director 110 may route connections to server 112A and server 112C so that their real response times can be checked. The session distribution schemes are further described below.

A startup round robin session distribution scheme is implemented in certain embodiments to avoid overwhelming a newly active machine. When a new machine is brought on line, it is likely that it will have far fewer connections than machines which are already actively handling connections. In such a case, for example if the least number of connections session distribution scheme is used, then every incoming connection would be routed to the newly active machine. This might quickly overload the machine or be otherwise undesirable. A startup session distribution scheme is used in such cases so that connections are distributed in a round robin fashion until conditions are stabilized. It should be noted that the Local Director implementing this round robin scheme differs from round robin DNS significantly since the virtual machine IP address is still used and real machine IP addresses are still not revealed to clients.

In certain embodiments, servers are failed when they fail to make a certain number of consecutive connections corresponding to a failure threshold. In some embodiments, each failed connection itself fails only after repeated attempts to make the connection are unsuccessful. The predicted response time for such a machine would still match the aged predicted response time from its last successful response. That predicted response time would be unduly optimistic since if the server has failed, then, in fact, the actual response time is going to be at least as long as it takes to fix the machine and bring it back up on line. The selection of the server based on its unrealistically good response time is therefore overridden by a failure flag. A further description of a system in which failures of individual physical machines are determined and failed machines are tested to determine if they can be placed on line again is described in detail in co-pending application Ser. No. 08/850,836 filed concurrently herewith, which is incorporated herein by reference for all purposes.

In certain applications, it is desirable to route consecutive connections from a client to the same server. This enables an individual real machine to carry the context of one or more past connections with the client over into a new connection. When the client knows the IP address of the real machine, the client can simply use that same IP address to connect again to the real machine. When the client only receives the virtual machine IP address, the client cannot insure that it connects to the proper machine by using the IP address of an individual physical machine. Local Director 110 keeps a record of the foreign (client) physical machine allocations so that certain consecutive connections from a client to a virtual machine within a set period time may be allocated to the same physical machine.

Figure 2:
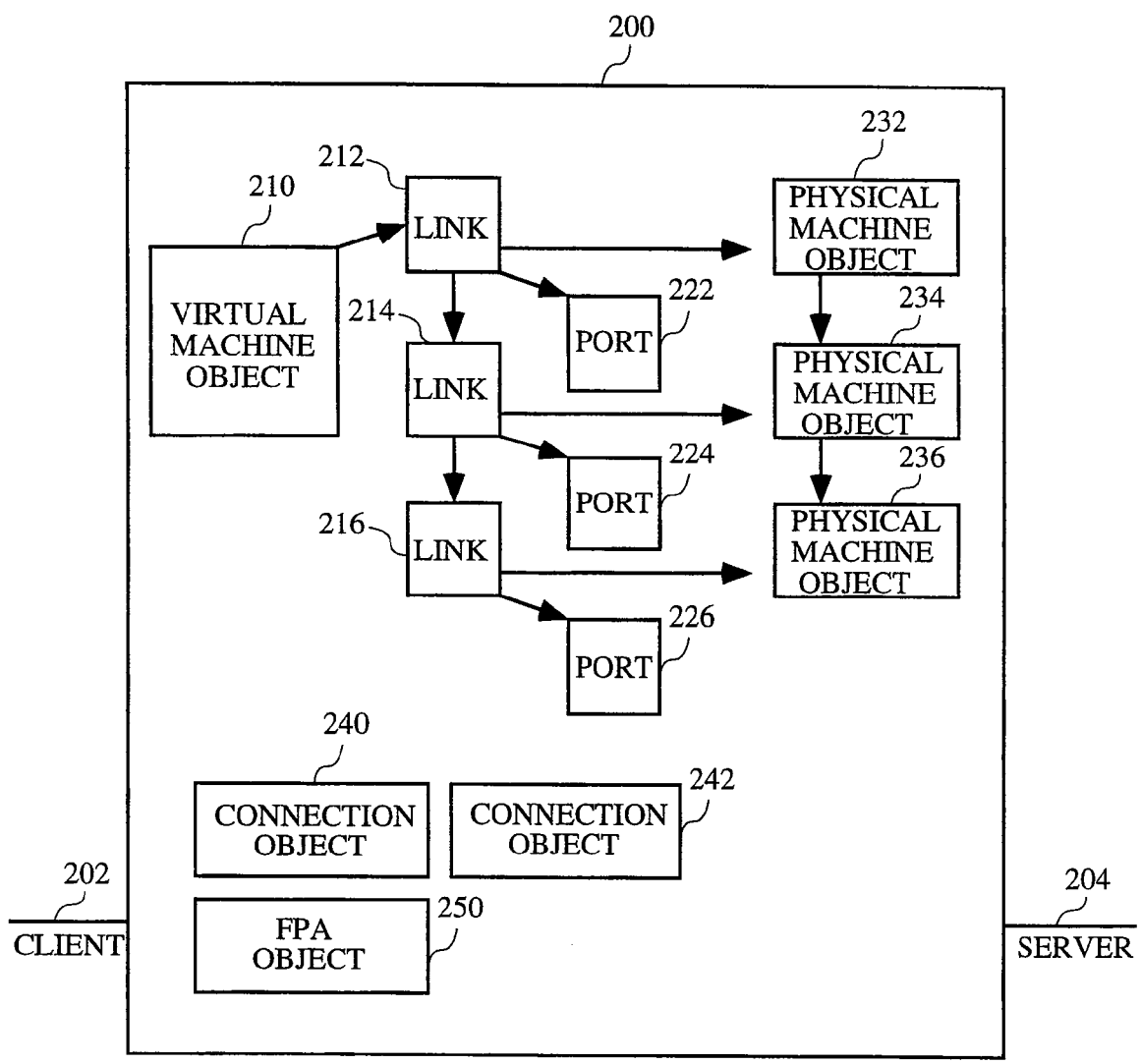
FIG. 2 illustrates the data structures which are used within the Local Director for the purpose of intercepting and rerouting inbound packets which have a destination IP address which corresponds to the IP address of a virtual machine which Local Director is simulating and changing the source IP address of outbound packets.

FIG. 2 illustrates the data structures which are used within the Local Director 200 for the purpose of intercepting and rerouting inbound packets which have a destination IP address which corresponds to the IP address of a virtual machine which Local Director 110 is simulating and changing the source IP address of outbound packets. Each packet sent to a virtual machine is rerouted to a real machine, and each connection made to a real machine is tracked. New connections are made to the real machine which is selected by the chosen session distribution scheme. The data structures which are within Local Director 110 are referred to herein as either data structures or objects. In this context, the term object refers to a block of memory which stores certain variables, addresses, flags, or pointers to other memory addresses areas. The information stored in the objects enables Local Director 110 to establish connections to the physical machine with the best response time and to keep track of those connections.

Local Director 110 is shown having a client line 202 and a server line 204. Client line 202 carries packets to and from client machines which are attempting to communicate with site 112 via a virtual machine which is being implemented by Local Director 110. Client machines are sometimes also referred to as foreign machines. Server line 204 sends packets to and from the physical machines or servers which handle the packets addressed to the virtual machine. The servers are also referred to as physical machines.

A virtual machine object 210 contains information about the virtual machine which is being simulated. Specifically, virtual machine object 210 includes the virtual machine's IP address and its physical machine association interval. The physical machine association interval is the maximum period of time between connections during which the virtual machine will ensure that a given client will continue to access the same physical server for subsequent connections. Virtual machine object 210 also includes a variable which records the state of the virtual machine (i.e., in service, out of service, or failed). Virtual machine object 210 also includes pointers to link objects which enable it to search among the physical machines for the best machine to handle a given connection request. The structure of virtual machine object 210 is shown in more detail in FIG. 3A. As noted above, the present invention also allows a given site to have multiple virtual addresses. In such cases, the Local Director will include multiple virtual machine objects, one for each virtual address.

A link object 212, a link object 214, and a link object 216 facilitate the search for the best physical machine to handle a connection. Each link object contains a pointer to the next link object as well as the pointer to a physical machine object. In embodiments where more than one virtual machine is mapped to the same set of physical machines, the link objects may also contain pointers to a port object which maps the port number specified for the virtual machine to the port number which will be used on the physical machine that is selected. In the example shown, link object 212 contains a pointer to port object 222; link object 214 contains a pointer to port object 224; and link object 216 contains to port object 226. The structure of the link objects and the port objects is shown in more detail in FIGS. 3E and 3F.

Local Director 110 also contains a number of connection objects including a connection object 240 and a connection object 242. The purpose of each connection object is to manage all of the relevant information about a given connection which is made from a client to one of the physical machines. Each connection object contains the IP address and port number of the foreign machine which is attempting to make a connection or has successfully made a connection to the virtual machine implemented by Local Director 110. These are referred to as the foreign IP address and the foreign port number. Connection objects 240 and 242 also includes the IP address and port number of the virtual machine which is being simulated. The connection object also contains a pointer to a physical machine object, and the physical machine port number to which the connection is made. Finally, connection objects 240 and 242 includes a multipurpose timer used to record the time of arrival of certain packets for the purpose of determining certain times intervals.

A physical machine object 232, a physical machine object 234, and a physical machine object 236 each represent a different physical machine to which connections can be made. Each physical machine object contains variables which store the state and response time of the physical machine which it represents. Each physical machine object also includes a pointer to the next physical machine object in the list of physical machine objects which is used to facilitate searching. The real IP address of the physical machine which it represents, the last response time of the physical machine, that state of the physical machine, and other detailed information about the characteristics and performance of the physical machine are also included in each physical machine object. The detailed structure of the physical machine object is shown in FIG. 3B.

Finally, Local Director 110 includes foreign physical assignments or FPA's such as an FPA object 250. FPA object 250 contains a pointer to a physical machine object, a foreign IP address and a time variable which records the time of the last activity on the connection between the physical machine that corresponds to the physical machine object and the client at the foreign IP address. FPA object 250 also includes pointers to other FPA objects to facilitate searching among the FPA objects. In one embodiment, a least recently used hash table is employed.

Each of the above described objects work together to enable Local Director 110 to route incoming packets from a client via client line 202 to a physical machine via server line 204. Local Director 110 also routes return packets from servers connected to server line 204 to clients connected to client line 202 in a manner that the packets appear to the client to have been sent by a virtual machine. Each packet that is received by Local Director 110 has a source IP address and port number as well as a destination IP address and port number. These four parameters are sometimes referred to as a "quad." Local Director 110 either finds the connection object which corresponds to the quad or else creates a new connection object, if appropriate.

As noted, information about the virtual machine is stored in machine object 210. The link objects 212, object 214, and object 216 link the virtual machine objects to physical machine objects 232, machine object 234, and machine object 236 which contain information about the various physical machines which are available to Local Director 110. A connection object, such as connection object 240 or connection object 242, is created for each connection which is made to a physical machine. The connection objects keep track of important information about each connection. Finally, FPA object 250 keeps track of those foreign machines connecting on client line 202 for which connections should be specially be routed to a given physical machine.

Figure 3A:
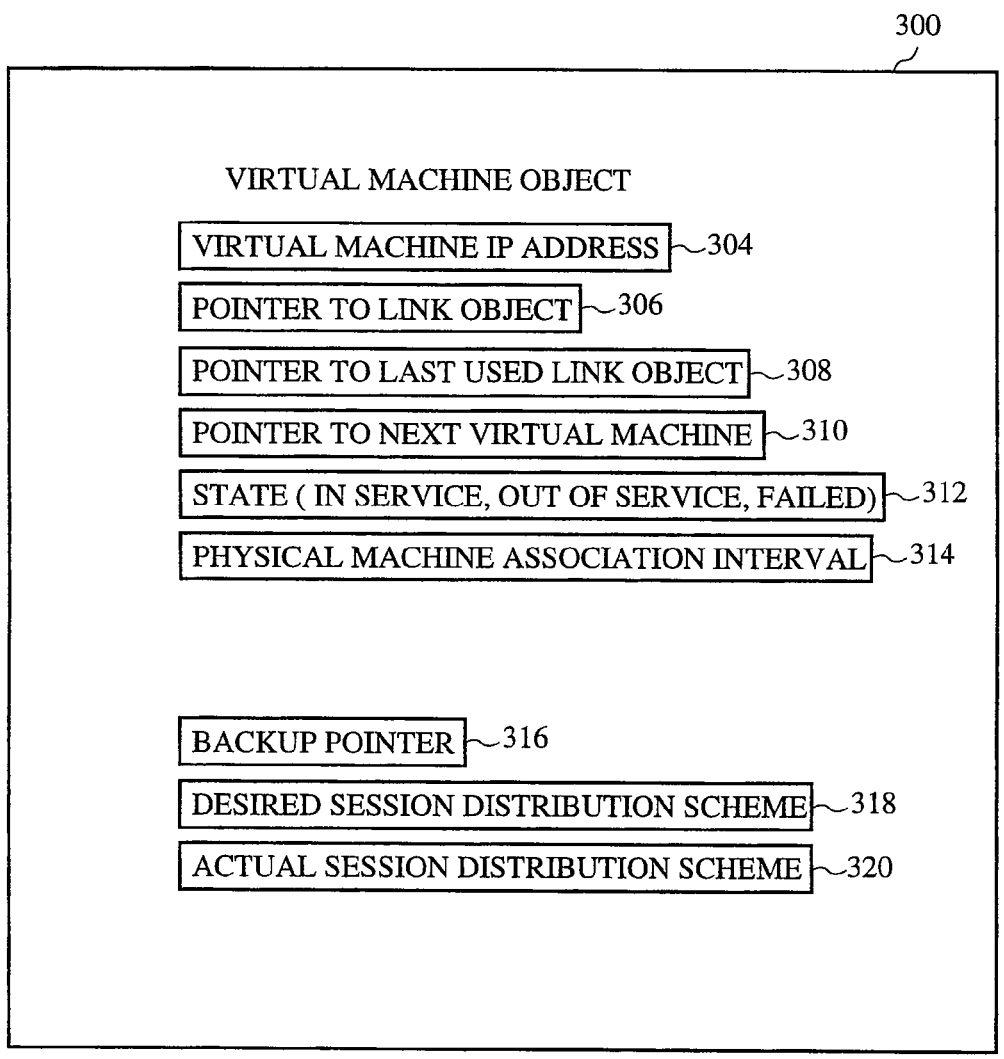
FIG. 3A illustrates the data structure of a virtual machine object.

FIG. 3A illustrates the data structure of a virtual machine object 300. Virtual machine object 300 includes a virtual machine IP address 304 which stores the IP address of one of the virtual machines which is being implemented by Local Director 110 and is represented by a particular virtual machine object. A pointer 306 to a link object facilitates searching for the physical machine object 302 which has the best predicted response according to the chosen session distribution scheme. A pointer 308 to the last used link object enables the virtual machine object to find the physical object which was last used, and to go to the next link object linking the next physical machine object so that a round robin DNS-type selection of physical machines may be implemented. This may be desirable, for example, in a startup situation where Local Director 110 has only recently been turned on and no predicted response times for available physical machines have been determined yet.

A pointer 310 to the next virtual machine facilitates searching the virtual machines in embodiments where more than one virtual machine is implemented by Local Director 110. A state variable 312 is included to store the state of the virtual machine which may be in service, out of service, or failed. A variable 314 used to store the physical machine association interval for the virtual machine is also included. The physical machine association interval determines the length of time between connections during which a connection from a specific foreign machine will be routed to the same physical machine as the last connection from that foreign machine.

A pointer 316 to a backup machine may also be included. A pointer 318 to and a pointer 320 which point to a desired session distribution scheme and an actual session distribution scheme are also included in certain embodiments.

FIG. 3B illustrates the data structure of a physical machine object 302. Physical machine object 302 is used to store information related to a particular physical machine which is available to Local Director 110 for the purpose of serving connections to a virtual machine. Physical machine object 302 contains a pointer 352 to the next physical machine object which facilitates searching among the physical machine objects. Physical machine object 302 also contains the real IP address of the physical machine which it represents. A variable 354 stores the response time of the physical machine and a variable 356 stores the number of virtual machines linked to the physical machine. A variable 358 stores a response time which is biased according to the age of the last response. In one embodiment, the response time is shortened as it ages. This is used as the predicted response time of the physical machine. A variable 360 stores a time stamp which is used to determine the age of the last response time. A variable 363 stores the MAC address of the physical machine.

A variable 364 stores the number of unanswered SYN connections for the physical machine. This information is important because available servers used in certain embodiments are not capable of handling more than five unanswered SYN requests. A variable 366 stores the state of physical machine. The state may either in service, out of service, or failed. A variable 368 keeps track of the number of ditched connections for the machine in one embodiment. A ditched connection is a connection which has been attempted a certain number of times to the physical machine without success so that the system has determined that the connection can not be made to that physical machine. The connection is therefore known as a "ditched connection". A variable 370 stores the connection failure threshold for the physical machine. The connection failure threshold determines how many connections the machine may ditch before it is classified as failed.

A variable 371 keeps track of the number of connections to the physical machine. This information is used in certain of the session distribution schemes. A variable 372 tracks the local port number on which the physical machine is implemented in certain embodiments. A variable 373 stores the maximum number of allowed connections for the physical machine and a variable 374 stores a connection time out interval which represents the amount of time a connection may be maintained to the machine with no activity. A pointer 375 points to a backup machine. A pointer 376 assigns a weight to the physical machine which is used in certain session distribution schemes which distribute connections based on which physical machine has the least number of connections to allocate more connections to machines with more capacity. A variable 377 indicates which ports are implemented on the physical machine.

Figure 3C:
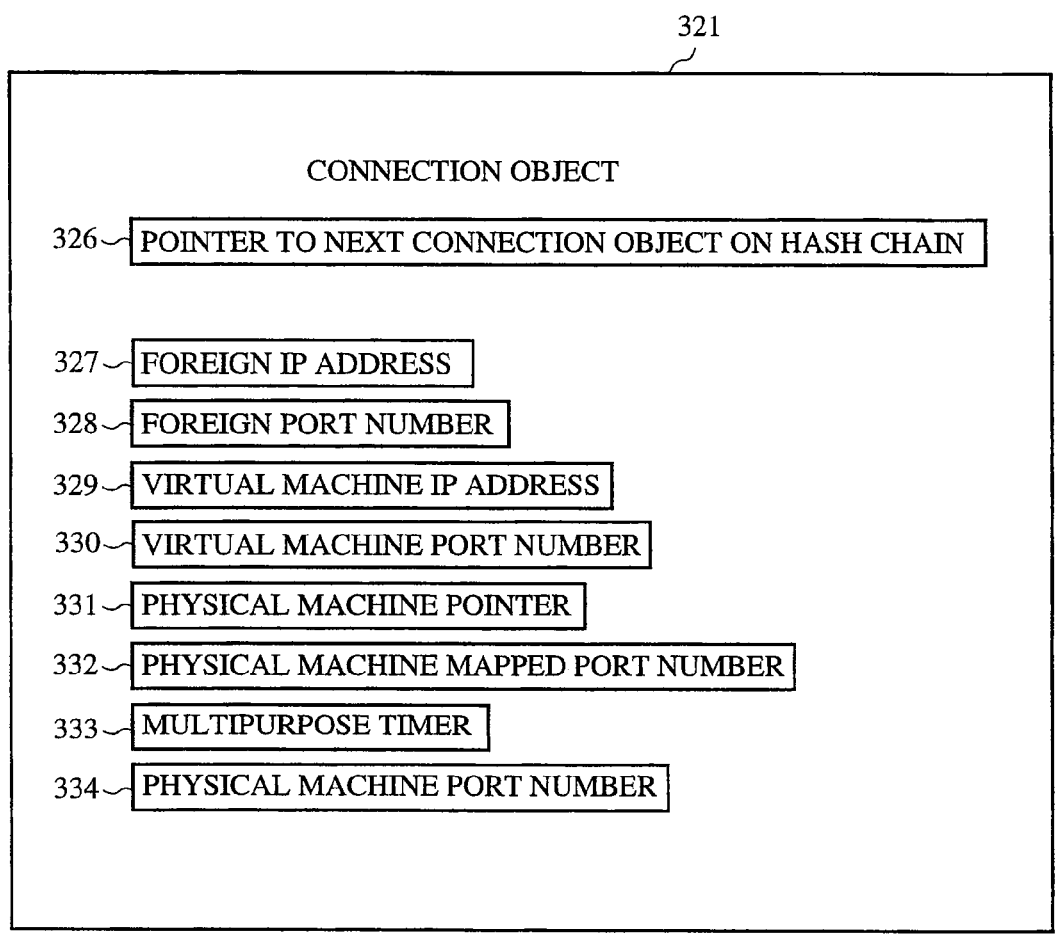
FIG. 3C illustrates a connection object data structure.

FIG. 3C illustrates a connection object data structure 321. Connection object 321 stores information related to individual connections made from a client to one of the physical machines. Connection object 321 includes a pointer 326 to the next connection object on its hash chain. This pointer facilitates searching among the connection objects. In a preferred embodiment, the individual connection objects are stored in hash buckets to facilitate retrieval. Connection object 321 also includes the foreign IP address 327 and foreign port number 328 of the client which is making the connection, and the virtual machine address 329 and virtual machine port number 380 of the virtual machine which is being implemented for the connection. Connection object 321 also contains a physical machine pointer 331 to the physical machine object which contains the information about the physical machine to which the connection is made. Variable 332 also stores the physical machine mapped port number. A multipurpose timer 333 is available to record the time at which certain connection events occur. A variable 334 keeps track of the physical machine port number to which the connection is made.

FIG. 3D illustrates a Foreign Physical Allocation (FPA) object data structure 322. FPA object data structure 322 stores information relating to certain clients whose connections are assigned to certain physical machines for a period of time and therefore are excluded from the allocation process. FPA object data structure 322 includes a pointer 386 to a physical machine object and a variable 387 which stores the foreign IP address of the client which is to connected to the physical machine corresponding to the physical machine object pointed to by pointer 386. Variable 388 keeps track of the time interval since a connection was last made to that physical machine by the foreign machine. FPA object data structure 322 also includes pointers 389 to other FPA objects which facilitate speedy searching of the FPA objects.

FIG. 3E illustrates a link object data structure 323. Link object 323 facilitates the selection of the physical machine which is to serve a connection which is attempted by a client to a virtual machine. Link object 323 contains a pointer 391 to the next link object as well as a pointer 392 to a physical machine object. Link object 323 also includes a pointer 393 to a port object. When a search of the physical machines for the physical machine with the best predicted response is initiated as a result of a connection request directed to a virtual machine, the virtual machine object points to a link object. The link object points to a physical machine object which contains the IP address of a physical machine as well as the information necessary to determine the response time of that physical machine. Since the link object also points to a next link object, the data relating to the next physical machine object (to which that link object points) is also available. Thus, the link objects point to each other and also to physical machine objects which contain the data needed to determine which physical machine has the best response time, and to open a connection to that machine.

FIG. 3F illustrates a Port object data structure 324. Port object 324 is used to map the port requested by the client to be accessed on the virtual machine to the port on the selected physical machine to which the connection is actually made. Port object 324 includes a pointer 395 which points to the next port object in order to facilitate searching the port objects. A variable 396 stores the port number as viewed by the client. A variable 397 stores the port number as mapped to a physical machine port.

Using the data structures shown in FIG. 2, and FIGS. 3A through 3F, Local Director 110 is able to receive a connection request directed to a virtual machine and use the link objects to check the predicted responsiveness according to a selected session distribution scheme of each of the physical machines available to it in order to determine the best physical machine to handle the connection. A connection object is defined which stores all relevant information related to each connection and an FPA object ensures that certain sequential connections from a given client are directed to the same physical machine.

Figure 4A:
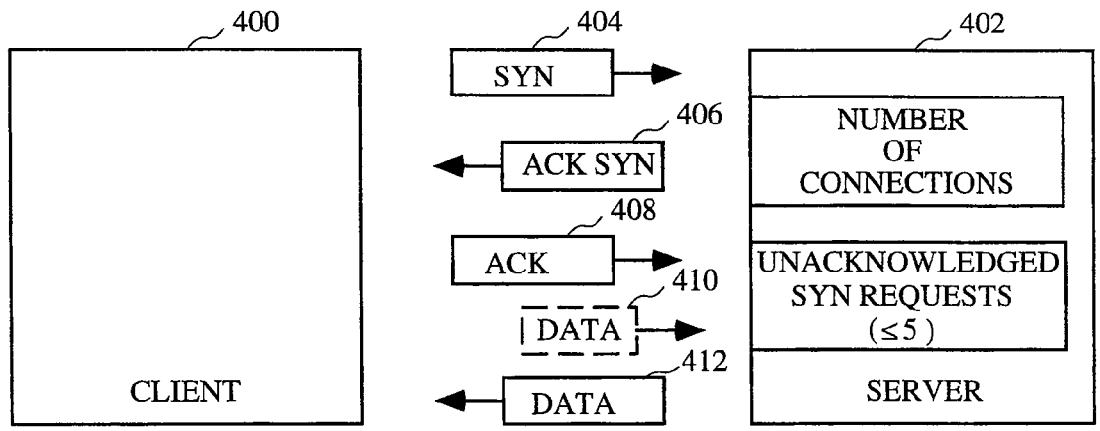
FIG. 4A illustrates in detail how a connection is established between a client and a server in one embodiment.

FIG. 4A illustrates in detail how a connection is established between a client and a server in one embodiment. A client 400 is shown attempting to connect to a server 402. The connection procedure is initiated when client 400 sends a SYN packet 404 to server 402. Server 402 receives packet 404 and, if server 402 has less than five unacknowledged SYN requests pending, server 402 accepts the SYN request. It should be noted that most currently commercially available servers are constrained by a limit of five unacknowledged SYN requests. The present invention is not limited to such servers, and would be equally applicable to servers which did not have this constraint. If the SYN request is accepted by server 402, then server 402 sends an acknowledge synchronization (ACK SYN) packet 406 to client 400. Client 400 then sends an ACK packet 408 back to server 402. This procedure is conforms to the standard TCP/IP protocol.

At this point, a connection has been established between client 400 and server 402. In certain applications, the next event is the sending of a data packet 410 from client 400 to server 402. Data packet 410 is shown as a dashed box because in certain applications, no data packet is sent from client 400 to server 402, and the next event is then the sending of a data packet 412 from server 402 to client 400. For example, if server 402 is a site on the World Wide Web providing HTML Web pages, then client 400 does send a data packet 410 to server 402 which contains the request to view a certain Web page. In other applications, such as Telnet and FTP file transfer, no data packet 410 is sent from client 402 to server 402, and the first event after the connection is established is the sending of the data packet 412 from server 402 to client 400.

Figure 4B:
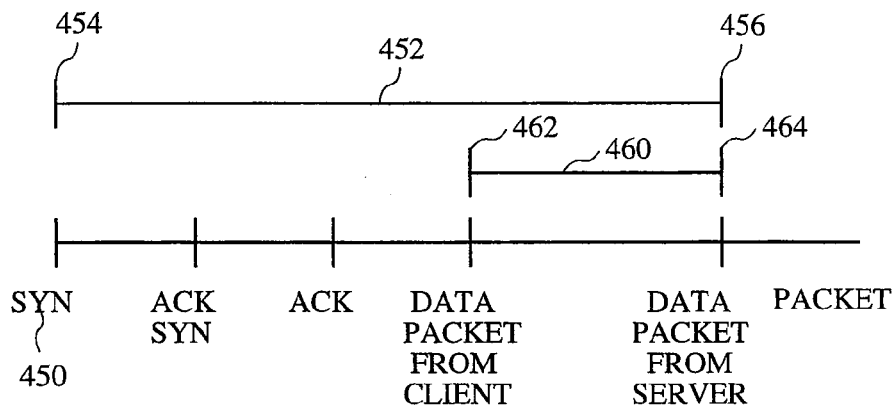
FIG. 4B illustrates in detail how the response time of a server is measured in certain embodiments.

FIG. 4B illustrates in detail how the response time of server 402 is measured in certain embodiments. A first event 450 is the sending of a SYN packet from client 400 to server 402. In one embodiment, a measured time interval 452 uses this event to mark a beginning time 454. The event which marks the ending time 456 of time interval 452 is the sending of a data packet from server 402 to client 400. Thus, 452 measures the time required for the exchange of a SYN, an ACK SYN, and an ACK packet between client 400 and server 402, plus the time required for a client 400 to send a data packet to server 402, plus the time required for server 402 to reply by sending a data packet back to client 400. In certain embodiments, it may be desirable to measure only a time interval 460, which has a beginning time 462 marked by the event of a data packet being sent from client 400 to server 402, and an ending time 464 marked by the event of a data packet being sent from server 402 to client 400.

It is advantageous to use time interval 460 in certain embodiments because it measures only the time required for server 402 to respond to a data packet from client 400 by sending a data packet in response. Time interval 452 also measures the time required for the exchange of synchronization and acknowledgment packets and that time period is partly dependent on external factors which are unrelated to actual responsiveness of server 402. However, as described above, in certain applications no data packet is sent from client 400 to server 402 and it is therefore necessary to measure a time interval with some other beginning event than the sending of a data packet from the client. It is also possible within the spirit and scope of this invention use other events to mark the beginning or end of a time interval which is used to measure the responsiveness of the server. For example, the time interval could begin with the sending of the ACK SYN packet from the server to the client.

In one embodiment, a timer is initialized upon the sending of the SYN packet from the client to the server. If no data packet is ever sent from the client to the server, then the sending of the SYN packet from the client continues to be the event which marks the beginning of the time interval which is measured and stored in the connection object. Upon the sending of a data packet from the client, the beginning time stored for the sending of the SYN packet is overwritten with the time determined for the sending of the data packet from the client. Thus, in this embodiment, time interval 452 is used as a default, and in cases where a data packet is sent from client, time interval 460 is automatically used instead.

Equation 470, equation 472, and equation 474 as shown in FIG. 4B describe how, in one embodiment, a "performance ratio" is determined for the server. In equation 470, R is the ratio of the time interval I which is measured for the server response as described above to the number of connections, NC, which are made to the server. A first order assumption is made that the response time per connection is roughly constant, and so R, the ratio of the last measured response time to the number of connections, is an approximation of the response time which may be expected for the next connection made to the server.

Because of the way that the response time is used to select the server which will be chosen to handle each incoming connection request, the actual predicted response used is aged so that the predicted responsiveness of the server improves over time as one would expect if the server becomes less loaded. Therefore, equation 472 shows that the predicted responsiveness is equal to the number of connections NC times R minus an aging function, f(r, t). The aging function, f(r, t), is subtracted from the product of NC and R so that over time, the predicted responsiveness decreases. Equation 474 shows an aging function which is used in one embodiment. The aging function, f(t), is set equal to the difference between the current time and an age stamp which corresponds to the time when the last measurement of a response time for the server was made, divided by 4. Thus, as the time difference between the current time and the time when the response time was last measured increases, the value of the aging function increases, and the predicted responsiveness decreases.

Equation 474 is only one example of an aging function which is used in one embodiment. Any aging function which causes the predicted responsiveness of the server to decrease over time could also be used within the spirit and scope of the present invention. Additionally, although the constant four is used in equation 474, other constants could be used to further tune the system and adjust the rate of improvement of the predicted response of the server. In certain embodiments, R is only allowed to change by a settable percentage for a single response to avoid degrading R too quickly after a single slow response caused by some transient factor.

Thus, the ratio R is the measured response time per number of connection to the server and the predicted response, PR, provides a predicted responsiveness for the next connection by using an aging function, f(t), to allow for the fact that as connections to the server are terminated, the predicted response for the server for the next connection should decrease. Using the aging function also prevents a problem from occurring when a server becomes temporarily overloaded and therefore provides a single very slow response. If the predicted response based on that low response was never aged, then the server would never again be selected to receive another connection. Even when all of that server's current connections are terminated, and the server's response time is presumably again very fast, no connection would be made to the server because of its recorded previous slow response time. Its current fast response time would never be discovered by the system. By aging the predicted responsiveness in a way that improves the predicted responsiveness, it is ensured that a server with a slow measured response time is tried again later when its response time may have improved.

As noted above, deriving a predicted response time using R, the ratio of the last measured response time divided by the number of connections, assumes that the response time increases roughly linearly with the number of connections. In some systems, this does not turn out to be the case. For example, sometimes the response time remains very fast until a critical number of connections is reached and then the response time increases drastically. In such a case, the predicted response time would not degrade rapidly enough to cause connections to be diverted from such a machine before it is too late. For this reason it is a feature of the present invention to provide a plurality of session distribution schemes which may be for different systems.

Figure 4C:
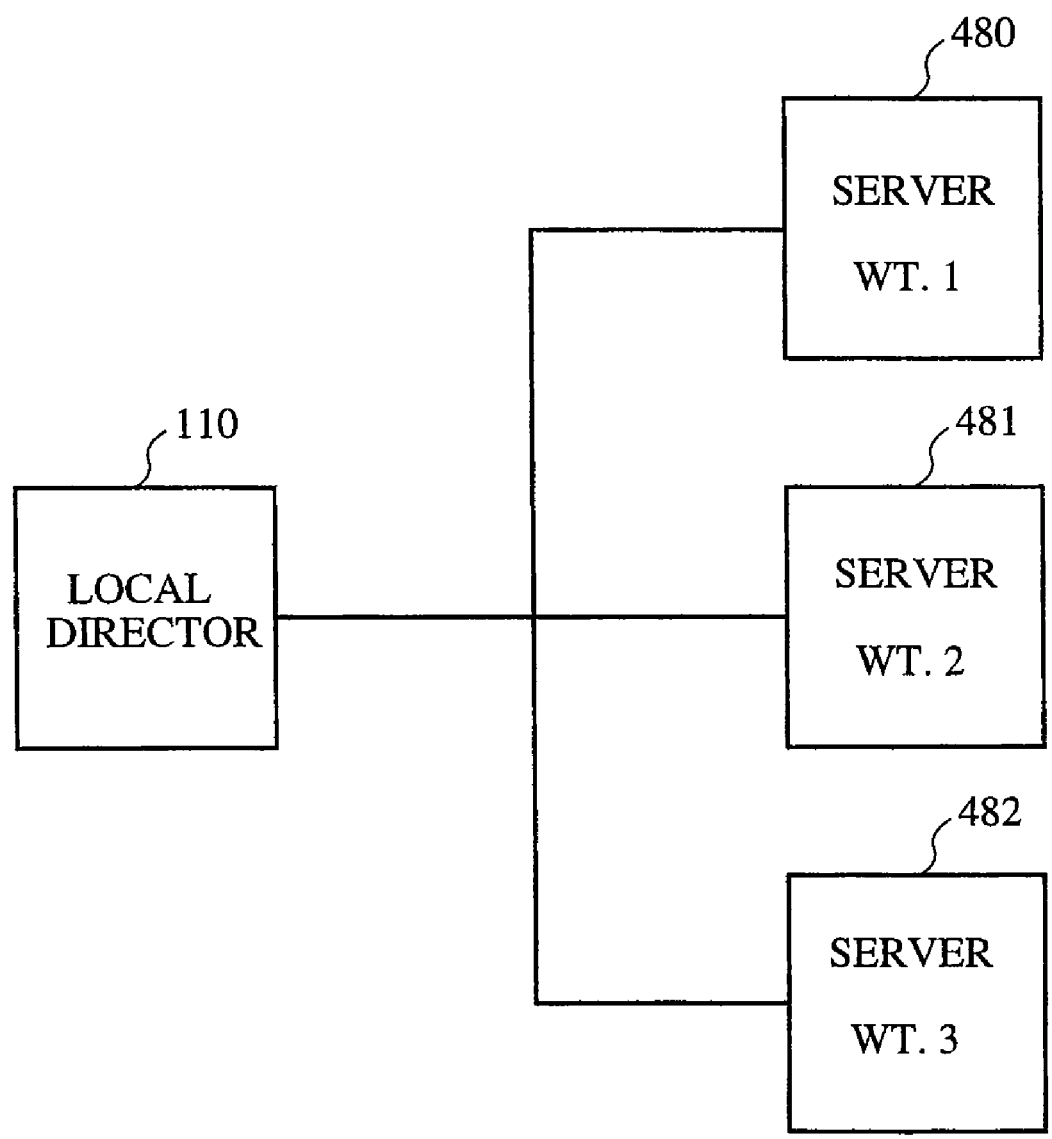
FIG. 4C illustrates a session distribution scheme based on the weighted number of connections made to each server.

FIG. 4C illustrates a session distribution scheme based on the weighted number of connections made to each server. A server 480 is arbitrarily assigned weight 1. A server 481 is assigned weight 2 because it has twice the capacity of server 480. A server 482 is assigned weight 3 because it is has three times the capacity of server 480. The sum of the weights is 6, representing the total capacity of the three server system. Connections are routed to the three servers by Local Director 110 according to their relative capacity. In one embodiment, this is done by dividing the number of connections to the machine by the server's weight to obtain a weighted number of connections to the machine. For example, if all three servers had 6 connections each, then server 480 would have 6 weighted connections, server 482 would have 3 weighted connections, and server 482 would have 2 weighted connections. Server 482 would therefore receive the next connection and would continue receiving connections until its weighted number of connections exceeded that of the other servers. Note that if each server is assigned the same weight, then this session distribution scheme selects the server based on the number of connections and treats each server the same.

Figure 5:
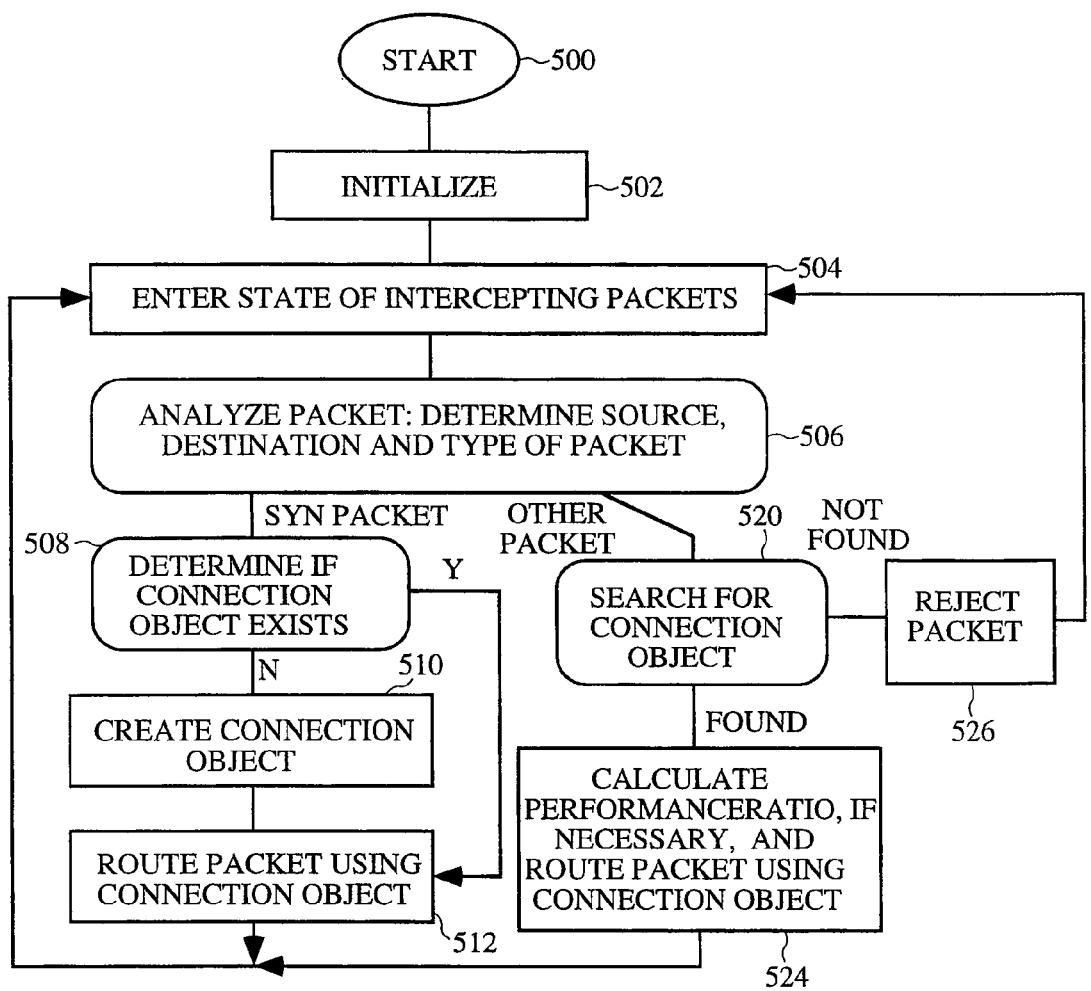
FIG. 5 is a process flow diagram which illustrates the process implemented on a Local Director for managing communication via packets between a virtual machine which is implemented by the Local Director using a set of physical machines and a client.

FIG. 5 is a flow diagram which illustrates a preferred process implemented on Local Director 110 for managing communication via packets sent through a virtual machine which is implemented by Local Director 110 using a set of physical machines and a client. The client is a foreign machine which has a foreign IP address. Local Director 110 simulates a virtual machine so that it appears to the client that it is accessing an actual physical machine which has the virtual IP address of the virtual machine. It is not evident to the client that it is actually communicating with one of many physical machines serving Local Director 110 for the purpose of simulating the virtual machine.

The process starts at 500 and the Local Director is initialized in a step 502. In a step 504, the Local Director enters a state wherein it intercepts all packets which are routed through it. Referring to FIG. 2, these packets are received on either client line 202 or server line 204. Whenever a packet is received, control is transferred to step 506 and the packet is analyzed. The source IP address of the packet and the destination IP address of the packet are determined, as well as the type of packet(e.g., TCP packets SYN, ACK, ACK SYN, data, etc.)

If the packet is a SYN packet, then control is transferred to a step 508. The Local Director determines if a connection object already exists for the SYN packet. This is accomplished by searching the connection objects (e.g., connection objects 240 and 242 of FIG. 2) for a connection which matches the foreign IP address and virtual machine IP address of the incoming SYN packet. In one embodiment, the connection objects are searched using a hash chain. A hashing function is used to hash virtual IP address and foreign IP address pairs to a given set of connections on a hash chain. Each connection object on an individual hash chain contains a pointer to the next connection object on that chain so that all of the connection objects on the chain can be quickly searched. Thus, the hashing function is used to quickly find a particular hash chain on which the connection object being searched for may be found. Each connection object on that hash chain contains a pointer to the next connection object so that if a connection object already exists for connection which the client is attempting to make, then it will be found in step 508. If no connection object is found, then a connection object is created in a step 510. Step 510 is described in further detail in FIG. 6. Control is then transferred to a step 512. If a connection object is found in step 508, then control is transferred directly to step 512 and the packet is routed using the connection object. Thus, step 512 either routes the packet using a newly created connection object from step 510 or the connection which was found in step 508. Step 512 is described in further detail in FIG. 10 and FIG. 11.

Thus, for each SYN packet received by the Local Director for a virtual machine which is being implemented by the Local Director, a connection object is either found or created for the connection which the SYN packet is attempting to establish. An example of an instance where a connection object would be found for a SYN packet is when a first SYN packet is received by the Local Director and an ACK SYN packet sent by the selected physical machine in response to that SYN packet for some reason is not received by the client. In such a case, the client would then resend a SYN packet. Upon intercepting the resent SYN packet, the Local Director would then find the connection object which was created for the first SYN packet which was sent to a physical machine but was not acknowledged. In general, the connection between the client and a physical machine may be broken at any point, resulting in the need for the client to resend a SYN packet to the server. In such a case, the SYN packet sent from the client to the server would be recognized as a SYN packet for a connection which already has a connection object. Connection objects for which there has been no recent activity may be periodically deleted or overwritten SYN packets are the only packets which are sent to a virtual IP address by Local Director 110 which do not necessarily already match a connection object. If, in step 506, the Local Director determines that the type of packet is any other packet than a SYN packet, then control is transferred to a step 520 and the Local Director searches for a connection object which matches the source and destination IP addresses of the packet as well as the source and destination ports. If no connection object is found for the packet in step 520, then control is transferred to step 526 and the packet is rejected. Rejected packets may be dropped in certain cases and may be bridged in others. In certain embodiments, Local Director 110 handles rejected packets differently according to the type of packet.

If a connection object is found in 520, then control is transferred to a step 524 where, for embodiments which use a performance ratio in a session distribution scheme, the performance of the physical machine is evaluated by calculating the performance ratio if the packet is a data packet from one of the physical machines serving a client. This step is described in greater detail in FIG. 11. Step 524 also includes routing the packet to its proper destination using the connection object which was found in step 520.

Whether the packet is routed using a new or found connection object for a SYN packet, or the packet is routed using a connection object which is found for a different type of packet or the packet is rejected, control is transferred back to 504 and the Local Director continues to intercept packets it receives along client line 202 and server line 204. Local Director 110 continues intercepting and processing packets until it fails or is interrupted. FIG. 5 thus illustrates how Local Director constantly intercepts packets, determines whether a connection object exists for those packets, creates connection objects where appropriate, and routes the packets to their proper destination.

Figure 6:
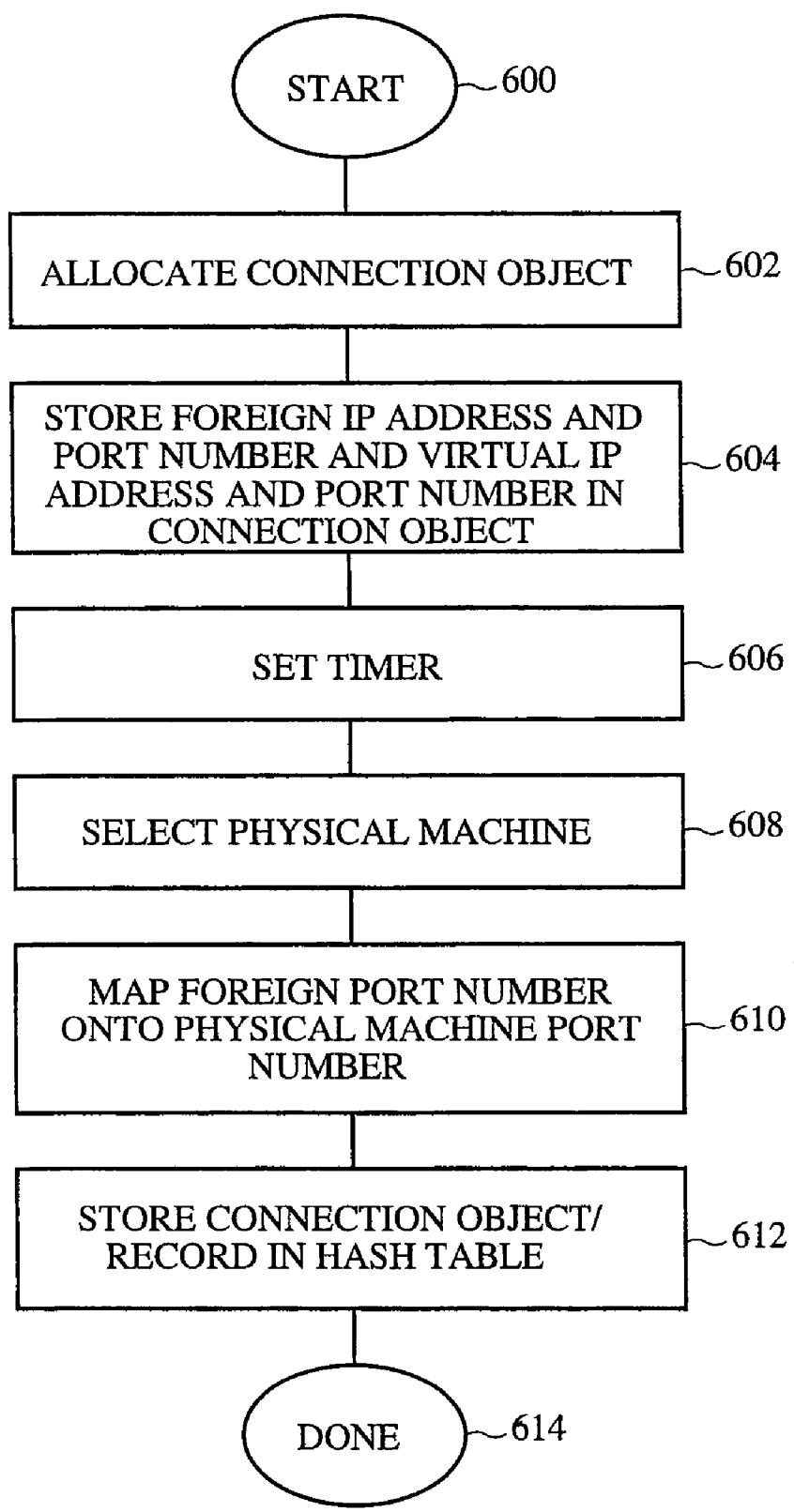
FIG. 6 is a flow diagram illustrating in detail the process implemented in creating a connection object.

FIG. 6 is a flow diagram illustrating in detail the process implemented in step 510 (creating a connection object) shown on FIG. 5. The process starts at 600 and in a step 602, a connection object is allocated from the portion of memory which is reserved for connection objects. In one embodiment, up to 1,000,000 connection objects may be defined. Sufficient memory space may be allocated for other numbers of connection objects in other Local Directors according to the demands of the system. In a step 604, the foreign IP address and foreign port number specified in the packet header of the incoming SYN packet for which the connection object is being allocated are copied into the fields within the connection object that store the foreign IP address and the foreign port number. Likewise, the virtual IP address and virtual port number are stored in the corresponding variables in the connection object. Next, in a step 606, the multipurpose timer of the connection is initialized so that it will mark the time that the SYN packet was received until it is reset by another event such as the receipt of a data packet from the client. This time is compared to the time at which a data packet is detected which has been sent by a physical machine to the client in order to determine the response time of the physical machine which is assigned to the connection.

In step 608, a physical machine is selected which will be assigned to the connection for which the connection object is being created. This involves determining whether or not a foreign physical assignment has already been made for client which is attempting to establish the connection and, if no foreign physical assignment has been made, then determining the best physical machine from among the physical machines available to the Local Director to assign the connection. Step 608 is implemented differently in different embodiments depending on the session distribution scheme selected by the user. Step 608 is described in further detail in FIGS. 7A through 7D.

In a step 610, the virtual port specified by the SYN packet is mapped onto a local port of the physical machine which was selected in step 608. In a step 612, the connection object which has now been completely specified is entered into the hash table which is used to facilitate searching among connection objects to find a specific connection object. As noted above, the purpose of organizing each connection object in a hash table is to facilitate the efficient searching of the connection objects. In other embodiments, the connection objects may be stored in a table and searched linearly. Finally, the process of building a connection object ends at 614.

It should be noted that, once a connection is established or terminated, the number of connections stored in the physical machine object which the connection object points to must be updated. In one embodiment, this occurs as soon as a SYN packet is sent and a connection object is created. In other embodiments, the number of connections is updated following the sending of a SYN ACK from the physical machine. Generally, the update can occur whenever the user desires to count the new connection. Similarly, the number of connections is updated when a connection is terminated. This can occur following a FIN or a FIN ACK, or following a time out period. Thus, the number of connections to each machine is available for the session distribution scheme.

Figure 7A:
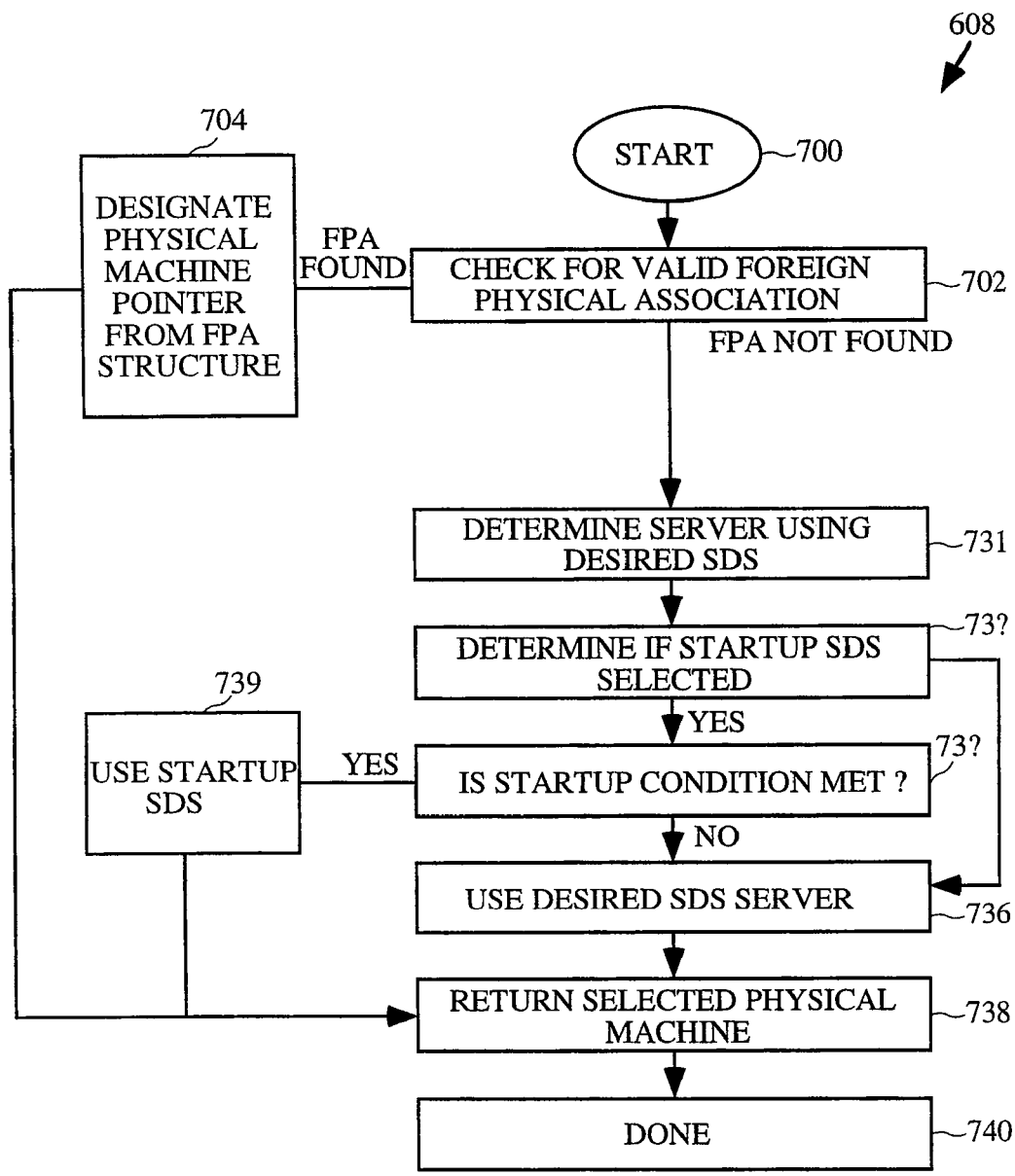
FIG. 7A is flow a diagram which describes in detail the process implemented for selecting the physical machine which is to be assigned to serve an incoming connection request.

FIG. 7A is flow a diagram which describes in detail the process implemented in step 608 of FIG. 6 for selecting the physical machine which is to be assigned to serve an incoming connection request. The physical machine is assigned to the connection object being created or built for an incoming connection request by including a pointer to the physical machine object which contains data about that particular physical machine inside the connection object which is being built as described in FIG. 6.

The process starts at 700. In a step 702, it is checked whether a foreign physical association (FPA) has been made for the source IP address of the incoming connection request. The Local Director first checks for a valid foreign physical association (FPA) which already specifies the physical machine to which the incoming connection requests from a specific client or foreign machine should be directed for a period of time specified by the physical machine association interval which is stored in each virtual machine object. The purpose a foreign physical assignment is to enable a foreign machine to continue to access the same physical machine to which it has previously connected as a result of a connection request made to a virtual machine implemented by the Local Director. The Local Director searches for a foreign physical assignment association by searching the FPA objects. The FPA objects are organized in a hash table for that purpose. The process implemented in step 702 for checking for a valid foreign physical association is described in further detail in FIG. 8.

If a foreign physical association object is found, and the time interval for that object is not exceeded, then the physical machine which is pointed to by the FPA is selected in a step 704. Control is then transferred to a step 738 where the selected physical machine is returned for inclusion in the connection object. If an FPA object is not found, then control is transferred to a step 731. In step 731, the best server according to the desired session distribution scheme is determined. In a step 732, the Local Director checks whether a startup session distribution scheme (sds) was selected.

If a startup session distribution scheme was selected, then control is transferred to a step 734 where the Local Director determines whether or not the startup condition is met. In one embodiment, the startup condition is the percentage of connections which are made to the machine chosen by the desired session distribution scheme. In other embodiments, all available physical machines are checked to determine whether a startup condition is met. The startup condition may be checked before the desired session distribution scheme is used to determine the desired server. If the startup condition is not met, then control is transferred to a step 736 and the desired function is used to determine the server which will be designated to handle the connection request. Likewise, if a startup session distribution scheme is not selected, then control is transferred to a step 736 and the desired function is used to determine the server which will be designated to handle the connection request. Control is then transferred to a step 738 where the selected physical machine is returned for inclusion in the connection object.

If the startup condition is met, then control is transferred to a step 739 and the startup session distribution scheme is used to determine the server which is to be designated to handle the connection. Control is then transferred to step 738 and the selected physical machine is returned for inclusion in the connection object. The process ends at 740.

As noted above, in one embodiment, the startup session distribution scheme is a round robin scheme. This scheme is implemented in one embodiment by storing the machine which was assigned the last connection and assigning the present connection to the next machine in a list. Thus, if the best machine determined from the desired algorithm is just starting up, or if the startup session distribution scheme is otherwise chosen, then connections are allocated according to the startup session distribution scheme in order to avoid sending every connection to that machine and overwhelming it. Once the startup condition no longer is realized, then servers are chosen based on the desired session distribution scheme.

Figure 7B:
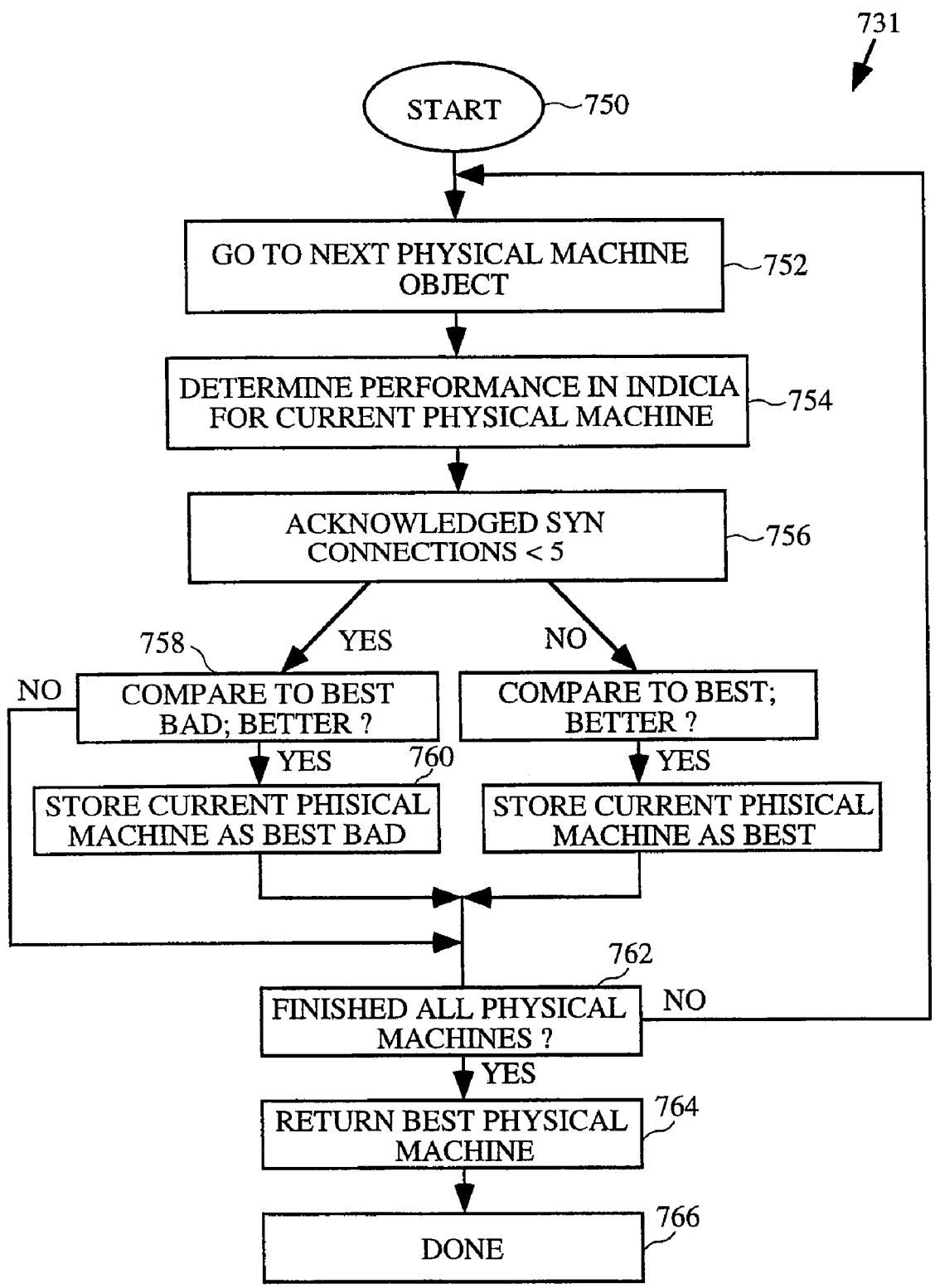
FIG. 7B is a process flow diagram which illustrates a process implemented to determine the best server to assign to the incoming connection using the session distribution scheme which is desired.

FIG. 7B is a process flow diagram which illustrates a process implemented in step 731 to determine the best server to assign to the incoming connection using the session distribution scheme which is desired. The process begins at 750 and is initialized. In a step 752, the next physical machine object which is not failed is found. The physical machine objects are found by using the pointer contained in the virtual machine object which points to a link object which points to a physical machine object. After each physical machine is checked, then the next link object which is pointed to by the previous link object is use to point to the next physical machine object. It should be noted that this particular data structure is implemented in one embodiment for the purpose of minimizing the amount of memory space used and facilitating searches of the physical machine objects. Other memory schemes could be used within the spirit and scope of the present invention.

The currently used performance indicia is determined for that physical machine. The performance indicia is chosen according to the session distribution scheme. In one embodiment, a weighted least number of connections session distribution scheme is used, the weight and the current number of connections would be retrieved from the physical machine object and used to determine the weighted number of connections. In another embodiment, a performance ration is used. In a step 576, the number of unacknowledged SYN connections is retrieved from the physical machine object and it is determined whether the number of unacknowledged SYN connections is greater than 5.

Since each physical machine can have at most five unacknowledged synchronization connections at a time, a machine with five unanswered synchronization connections would drop the next incoming SYN connection. Therefore, a physical machine with a worse predicted responsiveness but which has less than five unacknowledged SYN connections is a better choice to assign to the incoming connection than a machine with a better predicted responsiveness but which would drop the incoming SYN connections because it already has the maximum number of unacknowledged SYN connections. In a case where all of the physical machines in service have five unacknowledged SYN requests, then the best physical machine from among those machines (the best bad machine) is used.

If the number of unacknowledged SYN connections is greater than 5, then a step 758 compares the performance indicia of the current physical machine to the best bad machine. If it is better, then it is stored as the best bad machine in a step 760 and control is transferred to a step 762. If it is not better, then control is transferred directly to step 762. If the number of unacknowledged SYN connections is not greater than 5, then control is transferred to a step 764 and the current physical machine to the best machine. If it is better, then it is stored as the best machine in a step 766 and control is transferred to step 762. If it is not better, then control is transferred directly to step 762. Step 762 checks whether all physical machines have been compared and transfers control back to step 752 if any remain. When none remain, control is transferred to a step 764 and the best physical machine is returned. If a machine with less than or equal to 5 unanswered SYN connections was found, then the best machine is returned, and if no such machine was found, then the best bad machine is returned. The process ends at 766.

Figure 8:
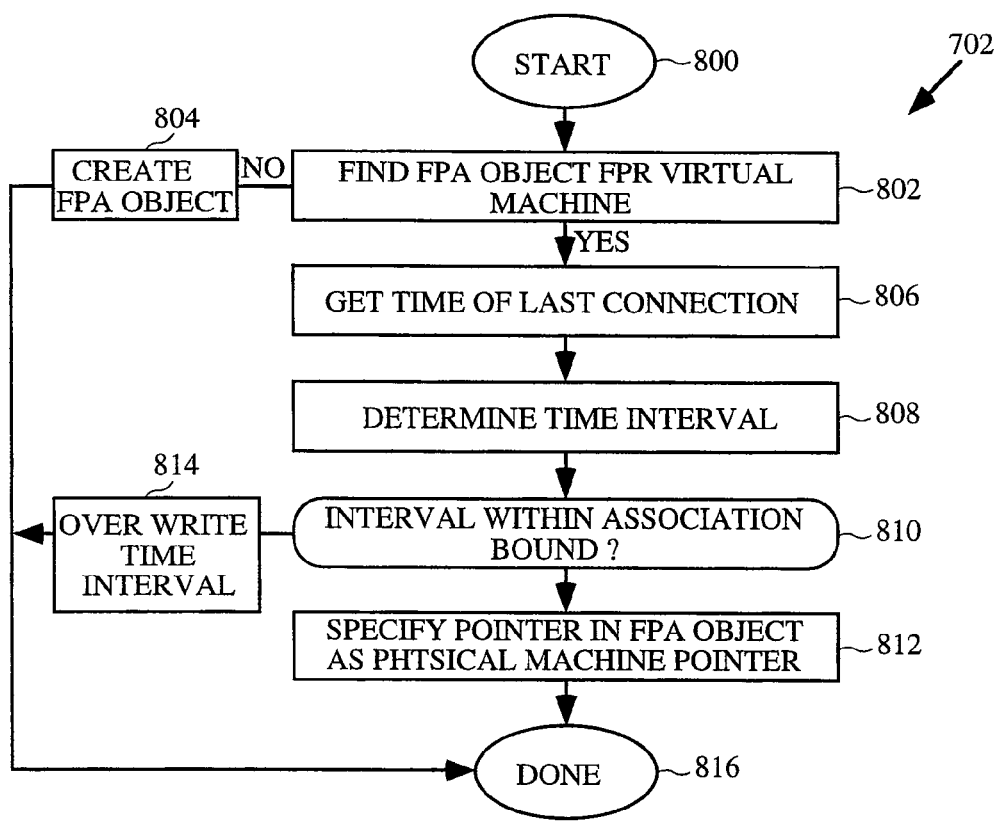
FIG. 8 is a flow diagram which describes in detail the process for checking whether a foreign physical association exists for the foreign IP address of an incoming SYN connection for which a connection object is being built.

FIG. 8 is a flow diagram which describes in detail the process implemented in step 702 of FIG. 7A for checking whether a foreign physical association exists for the foreign IP address of an incoming SYN connection request for which a connection object is being built according to the process shown in FIG. 6. The process begins at 800 and in a step 802, a search is made for an FPA object which corresponds to the foreign IP address. This search is accomplished using the hash tables associated with the FPA objects. If no FPA object is found, then an FPA object is created in a step 804. The process then ends at 816 without a physical machine object being specified.

When an FPA object is found which corresponds to the foreign IP address, then control is transferred to a step 806. Step 806 gets from the FPA object the time at which a connection from the foreign IP address was last assigned to the physical machine. Next, step 808 subtracts that time from the current time to determine the interval of time which has elapsed since the last connection was assigned to the physical machine designated by the pointer in the FPA object from the foreign IP address stored in the FPA object. Once the time interval is determined in step 808, control is transferred to a step 810 which checks whether the interval determined in step 808 is less than the physical machine association interval specified in the virtual machine object that corresponds to the virtual machine IP address. If the interval is less than the maximum physical machine association interval specified in the virtual machine object, then control is transferred to a step 812, which specifies the physical machine pointer which is contained in the FPA object as the pointer which points to the physical machine to which the connection request is assigned. The physical machine pointer specified in step 812 is used in the connection object being built as the physical machine pointer.

If the interval determined in the step 808 is not within the physical machine association interval specified in the virtual machine object, then control is transferred to a step 814 and the time stored in the FPA object is overwritten. The process then ends at 816 without a physical machine object being specified.

Thus, if in step 702, a valid foreign physical association is determined for the incoming connection request, then the physical machine pointer in the FPA object that specifies the foreign physical association is used to build the connection object. A foreign physical association is determined to be valid if the time that has elapsed since the last connection made from the foreign IP address to a physical machine is less than the maximum physical machine association interval specified in the virtual machine object. If no valid FPA object is found, then a search is made for the physical machine with the best predicted responsiveness according to the selected session distribution scheme so that the connection may be assigned to it.

Figure 9:
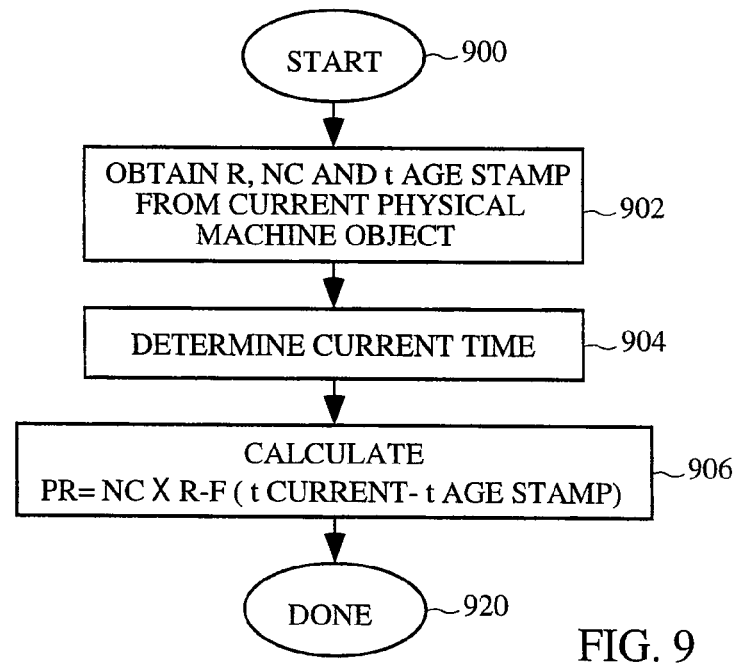
FIG. 9 describes in detail the process for calculating the predicted response time of a physical machine based on the information attained from the physical machine object corresponding to that physical machine.

FIG. 9 describes in detail the process implemented in one embodiment for calculating the predicted responsiveness of a physical machine based on the information attained from the physical machine object corresponding to that physical machine. The process starts at 900. In a step 902, R, NC, and $t_{agestamp}$ are each obtained from the current physical machine object. Next, in a step 904, the current time is obtained. In a step 906, the predicted responsiveness is calculated according to the formula:

$$PR=NC*R-f(t_{current}-t_{age\,stamp})$$

The process ends at 920.

Figure 10:
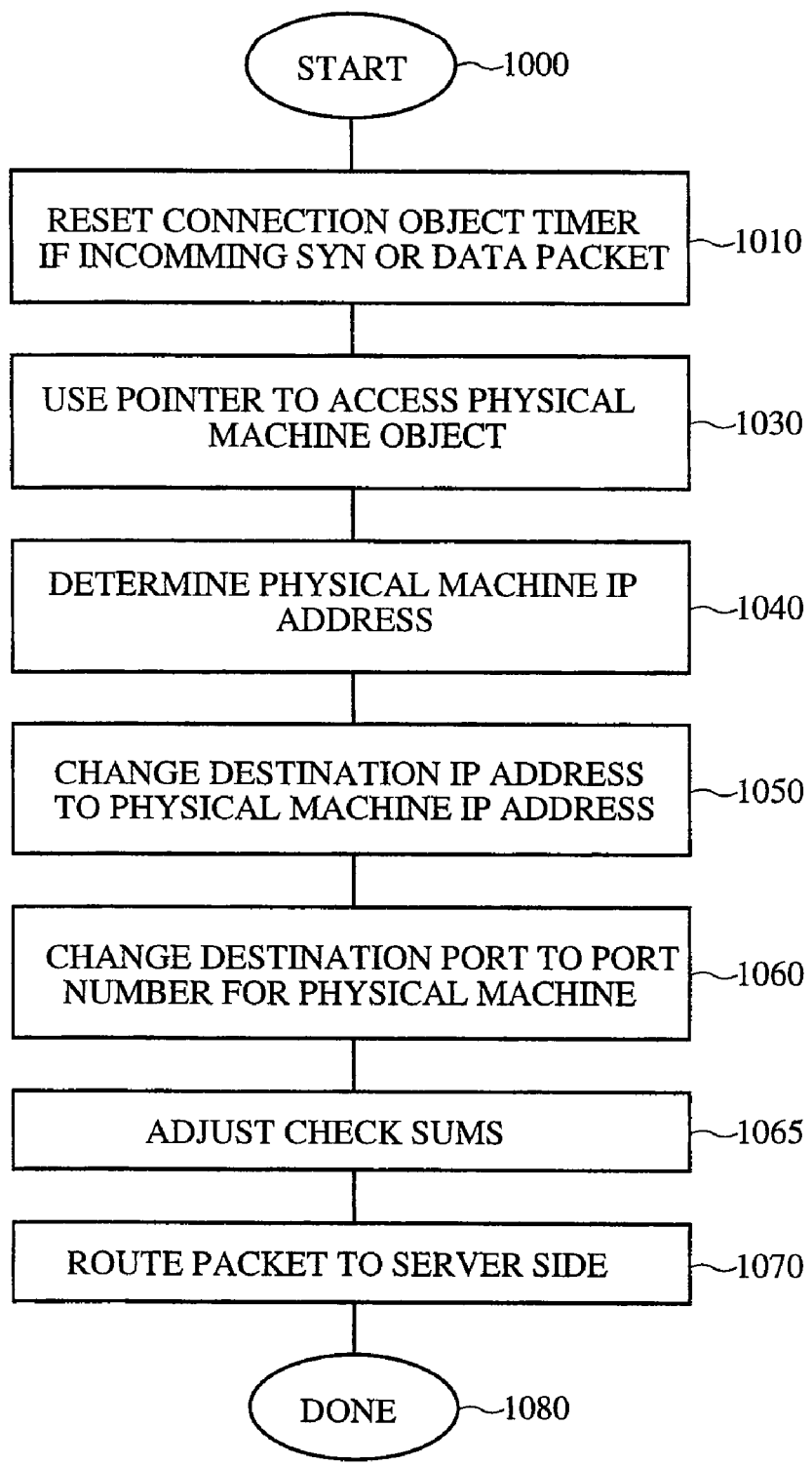
FIG. 10 is flow diagram which illustrates the process implemented by the Local Director to translate the destination IP address of an incoming data packet from a client and route that data packet to the proper physical machine which is connected to the Local Director.

FIG. 10 is flow diagram which illustrates the process implemented by the Local Director to translate the destination IP address of an incoming data packet from a client and route that data packet to the proper physical machine which is connected to the Local Director (i.e., step 512 described from FIG. 5). The process is based on the Local Director finding the connection object which defines the proper destination IP address for the packet so that it is routed to the right physical machine. If no connection object already exists, the Local Director creates a connection object for the connection. As described in FIG. 6 and FIGS. 7A and &B, creating the connection object includes determining the best physical machine to handle the connection.

The process begins at 1000. The Local Director has intercepted an incoming data packet that has a destination IP address that corresponds to one of the virtual machines which is being implemented by the Local Director. A connection object was either found or created for the packet. In a step 1010, the connection object timer is reset if the packet is an incoming data packet from a client. If the packet is an incoming SYN packet from a client then the connection object timer is also reset. In a step 1030, the pointer in the connection object which points to the physical machine object for the connection is used to access that physical machine object. In a step 1040, the physical machine object returns the IP address of the physical machine which the connection object has specified for the connection.

The Local Director now has the information necessary change the destination IP address in the incoming packet by replacing the virtual machine IP address with the physical machine IP address to which the connection is to be routed. In a step 1050, the Local Director changes the destination IP address of the incoming packet to match the IP address which it obtained from the physical machine object pointed to by the connection object. In a step 1060, the destination port number of the incoming packet is changed to the correct port number for that physical machine. Since these changes to the packet header effect the check sums which determine whether the packet has been corrupted, a step 1060 adjusts the check sums so that the changes do not appear to have corrupted the data. Next, in step 1070, the packet is routed to the server side of the Local Director and the process is completed at 1080.

Figure 11:
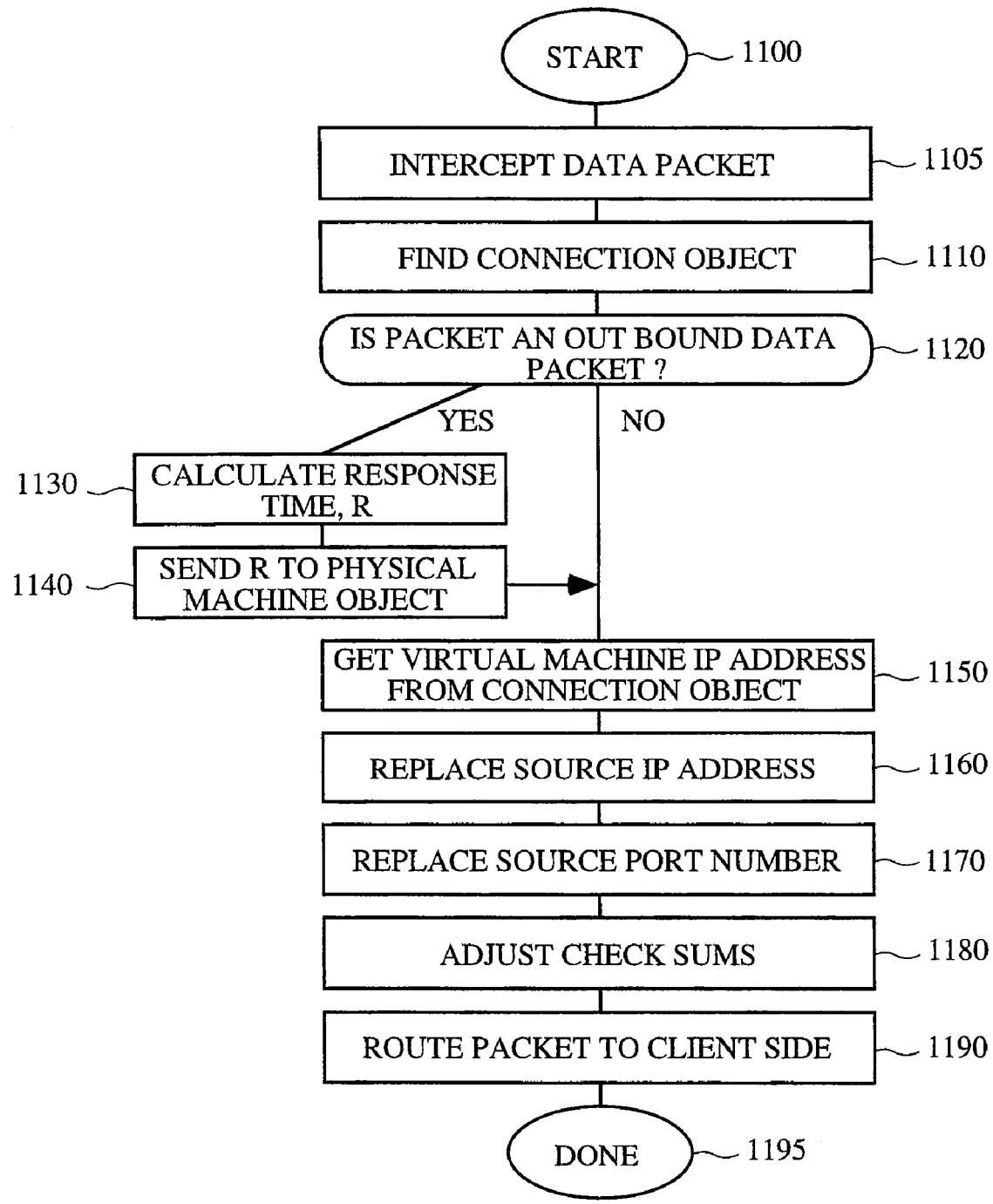
FIG. 11 is a flow diagram which describes the process implemented on the Local Director for translating and routing data packets outbound to clients.

FIG. 11 is a flow diagram which describes the process implemented on the Local Director for translating and routing data packets outbound to clients. A packet sent from one of the physical machines connected to the Local Director will have the proper destination IP address to the intended outside client, but the source IP address will be the source IP address of the physical machine and not the IP address of the virtual machine which the Local Director is simulating. It is therefore necessary to replace the source IP address of the physical machine with the source IP address of the virtual machine which is being simulated. This is accomplished by finding the connection object for the data packet and using the virtual machine IP address and port number found in the connection object.

The process begins at 1100. An outbound data packet is intercepted at a step 1105. The Local Director then finds the connection object for that data packet in a step 1110. In a step 1120, it is determined whether or not the packet is an outbound data packet. If the packet is an outbound data packet, then control is transferred to a step 1130, where the ratio R is calculated according to the formula:

$$R = t_{current} - t_{co}$$

R is the response time of the physical machine and it is measured in this process by taking the current time and subtracting the time recorded in the multipurpose timer of the connection object. This is the time period which the server required to send a data packet after the time recorded in the connection object for an event chosen as described in FIG. 2 for the purpose of measuring the server's response time. For example, the recorded time may be the time at which the Local Director received a data read request from an external client. In a step 1140, the response time R is sent to the physical machine object where it stored for later use in determining the predicted responsiveness of that physical machine as described above. It should be noted that in certain embodiments where a session distribution scheme is implemented that does not use response time, calculating R may be skipped.

Control is then transferred to a step 1150. If the packet is not an outbound data packet, then control is transferred directly from step 1122 to step 1150. In step 1150, the connection object returns the virtual machine IP address corresponding to the virtual machine from which the packet is to be sent. Next, in a step 1160, the source IP address of the packet is replaced with the virtual machine IP address from the connection object. In step 1170, the source port number is replaced with the virtual machine port number, if necessary. The check sum of the packet header is adjusted in step 1180 and finally, the packet is routed to the client side of the Local Director in a step a 1190. The process ends at 1195.

The Local Director thus functions to receive packets on its client side intended for a virtual machine which the Local Director is simulating and routes those packets to the physical machine which has the best predicted responsiveness of all the physical machines available to the Local Director. This is accomplished by defining a connection objects for each of the connections requested by the clients. The connection object keeps track of the virtual machine to which the client is attempting to connect as well as the physical machine to which the Local Director has assigned to that connection. The source IP address is replaced in all outbound data packets from physical machines so that it appears to the client that it is receiving packets from the virtual machine which it attempted to access. The Local Director also determines whether or not to route the connection to the same machine which the client previously accessed for certain connection requests that are made by a client which has previously connected to a particular physical machine. Additionally, the connection object records the time at which certain packets are sent or received to facilitate determining response times for each physical machine. Thus, the Local Director effectively simulates the existence of one or more virtual machines to outside clients and optimally selects a physical machine to actually handle the clients.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. It is therefore intended that the following appended claims be interpreted as including all such alterations, permutations, and equivalents as fall within the spirit and scope of the present invention.

What is claimed is:

1. A method for distributing packets among a plurality of physical machines, comprising:
    establishing a plurality of virtual machines each associated with one or more physical machines;
    receiving a packet associated with a session and indicating one of the plurality of virtual machines;
    determining predicted response times for each physical machine, wherein predicted response times are determined according to one of a number of active connections for each physical machine and a time delay interval for each physical machine selected for the associated virtual machine;
    identifying a particular physical machine that is predicted to process the packet in the shortest amount of time;
    identifying a particular virtual machine associated with the particular physical machine;
    routing the packet to the particular physical machine associated with the particular virtual machine.

2. The method of claim 1, further comprising:
    determining a number of active connections for each physical machine associated with the virtual machine;
    identifying a physical machine having the fewest active connections as the particular physical machine.

3. The method of claim 1, further comprising:
    determining a time delay interval for each physical machine associated with the virtual machine, the time delay interval being a time between receipt of a packet and generation of a response to the packet;
    identifying a physical machine having the shortest time delay interval as the particular physical machine.

4. The method of claim 3, further comprising:
    identifying a physical machine not having the shortest time delay interval as the particular physical machine;
    establishing a new time delay interval for the particular physical machine.

5. The method of claim 1, further comprising:
    determining whether a physical machine has been newly activated;
    successively selecting the physical machines as the particular physical machine in response to a newly activated physical machine until the newly activated physical machine has stabilized.

6. The method of claim 1, further comprising:
    determining whether a physical machine has failed;
    overriding identification of the failed physical machine as the particular physical machine.

7. The method of claim 1, further comprising:
    determining whether the packet associated with the session has an originating address associated with a previous session;
    identifying a same physical machine as identified for the previous session as the particular physical machine.

8. The method of claim 7, wherein the same physical machine is identified if the session falls within a set period of time from the previous session.

9. A system for distributing packets among a plurality of physical machines, comprising:

means for storing an association of a plurality of virtual machines each associated with one or more physical machines;

means for receiving a packet associated with a session and indicating one of the plurality of virtual machines;

means for determining predicted response times for each physical machine, wherein predicted response times are determined according to one of a number of active connections for each physical machine and a time delay interval for each physical machine selected for the associated virtual machine;

means for identifying a particular physical machine that is predicted to process the packet in the shortest amount of time;

means for identifying a particular virtual machine associated with the particular physical machine;

means for routing the packet to the particular physical machine associated with the particular virtual machine.

10. The system of claim 9, further comprising:
means for determining a number of active connections for each physical machine associated with the virtual machine;
means for identifying a physical machine having the fewest active connections as the particular physical machine.

11. The system of claim 9, further comprising:
means for determining a time delay interval for each physical machine associated with the virtual machine, the time delay interval being a time between receipt of a packet and generation of a response to the packet;
means for identifying a physical machine having the shortest time delay interval as the particular physical machine.

12. The system of claim 11, further comprising:
means for identifying a physical machine not having the shortest time delay interval as the particular physical machine;
means for establishing a new time delay interval for the particular physical machine.

13. The system of claim 9, further comprising:
means for determining whether a physical machine has been newly activated;
means for successively selecting the physical machines as the particular physical machine in response to a newly activated physical machine until the newly activated physical machine has stabilized.

14. The system of claim 9, further comprising:
means for determining whether a physical machine has failed;
means for overriding identification of the failed physical machine as the particular physical machine.

15. The system of claim 9, further comprising:
means for determining whether the packet associated with the session has an originating address associated with a previous session;
means for identifying a same physical machine as identified for the previous session as the particular physical machine.

16. The system of claim 15, wherein the same physical machine is identified if the session falls within a set period of time from the previous session.

17. A computer readable medium including code for distributing packets among a plurality of physical machines, the code operable to:
establish a plurality of virtual machines each associated with one or more physical machines;
receive a packet associated with a session and indicating one of the plurality of virtual machines;
determine predicted response times for each physical machine, wherein predicted response times are determined according to one of a number of active connections for each physical machine and a time delay interval for each physical machine selected for the associated virtual machine;
identify a particular physical machine that is predicted to process the packet in the shortest amount of time;
identify a particular virtual machine associated with the particular physical machine;
route the packet to the particular physical machine associated with the particular virtual machine.

18. The computer readable medium of claim 17, wherein the code is further operable to:
determine a number of active connections for each physical machine associated with the virtual machine;
identify a physical machine having the fewest active connections as the particular physical machine.

19. The computer readable medium of claim 17, wherein the code is further operable to:
determine a time delay interval for each physical machine associated with the virtual machine, the time delay interval being a time between receipt of a packet and generation of a response to the packet;
identify a physical machine having the shortest time delay interval as the particular physical machine.

20. The computer readable medium of claim 19, wherein the code is further operable to:
identify a physical machine not having the shortest time delay interval as the particular physical machine;
establish a new time delay interval for the particular physical machine.

21. The computer readable medium of claim 17, wherein the code is further operable to:
determine whether a physical machine has been newly activated;
successively select the physical machines as the particular physical machine in response to a newly activated physical machine until the newly activated physical machine has stabilized.

22. The computer readable medium of claim 17, wherein the code is further operable to:
determine whether a physical machine has failed;
override identification of the failed physical machine as the particular physical machine.

23. The computer readable medium of claim 17, wherein the code is further operable to:
determine whether the packet associated with the session has an originating address associated with a previous session;
identify a same physical machine as identified for the previous session as the particular physical machine.

24. The computer readable medium of claim 23, wherein the same physical machine is identified if the session falls within a set period of time from the previous session.

25. A system for distributing packets among a plurality of physical machines, comprising:
a plurality of physical machines;
a local director operable to establish a plurality of virtual machines each associated with one or more of the plurality of physical machines, the local director operable to receive a packet associated with a session and indicating one of the plurality of virtual machines, the local director operable to determine predicted response times for each physical machine according to a session distribution scheme, wherein predicted response times are determined according to one of a number of active connections for each physical machine and a time delay interval for each physical machine selected for the associated virtual machine, the local director operable to identify a particular physical machine that is predicted to process the packet in the shortest amount of time, the local director operable to identify a particular virtual machine associated with the particular physical machine, the local director operable to route the packet to the particular physical machine associated with the particular virtual machine identified in the session distribution scheme.

26. The system claim 25, wherein the local director is operable to determine a number of active connections for each physical machine associated with the virtual machine, the local director operable to identify a physical machine having the fewest active connections as the particular physical machine.

27. The system of claim 25 wherein the local director is operable to determine a time delay interval for each physical machine associated with the virtual machine, the time delay interval being a time between receipt of a packet and generation of a response to the packet, the local director operable to identify a physical machine having the shortest time delay interval as the particular physical machine.

28. The system of claim 27, wherein the local director is operable to periodically age and update the time delay interval for each physical machine.

29. The system of claim 27 wherein the local director is operable to identify a physical machine not having the shortest time delay interval as the particular physical machine, the local director operable to establish a new time delay interval for the particular physical machine.

30. The system of claim 25, wherein the local director is operable to determine whether a physical machine has been newly activated, the local director operable to successively select the physical machines as the particular physical machine in response to a newly activated physical machine until the newly activated physical machine has stabilized.

* * * * *